(12) United States Patent
Takenaka et al.

(10) Patent No.: US 7,536,011 B2
(45) Date of Patent: May 19, 2009

(54) TAMPER-PROOF ELLIPTIC ENCRYPTION WITH PRIVATE KEY

(75) Inventors: Masahiko Takenaka, Kawasaki (JP); Tetsuya Izu, Kawasaki (JP); Kouichi Itoh, Kawasaki (JP); Naoya Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 11/045,111

(22) Filed: Jan. 31, 2005

(65) Prior Publication Data

US 2005/0152541 A1 Jul. 14, 2005

Related U.S. Application Data

(63) Continuation of application No. PCT/JP02/13269, filed on Dec. 18, 2002.

(51) Int. Cl.
*H04L 9/00* (2006.01)
*H04L 9/28* (2006.01)
*H04L 9/30* (2006.01)

(52) U.S. Cl. ............... 380/28; 380/29; 380/30; 713/162; 713/163

(58) Field of Classification Search ............ 380/28
See application file for complete search history.

(56) References Cited

U.S. PATENT DOCUMENTS 6,738,478 B1 * 5/2004 Vanstone et al. ............ 380/28

FOREIGN PATENT DOCUMENTS

| WO | WO 00/25204 | 5/2000 |
| WO | WO 01/08012 | 2/2001 |
| WO | WO 2004/055756 | 7/2004 |

OTHER PUBLICATIONS

Cryptographic Hardware and Embedded System, Lecture Notes in Computer Science, vol. 1717, pp. 292-302, year: 1999.*
"Protections against Differential Analysis for Elliptic Curve Cryptography", 3rd International Workshop, pp. 377-390, May 2001).*
"Random Register Renaming to Foil DPA" (May 2001).*
"Resistance Against Differential Power Analysis for Elliptic Curve Cryptosystems", Jean-Sébastien Coron, Cryptographic Hardware and Embedded Systems, Cetin K. Koc Christof Paar (Eds.), First International Workshop, CHES'99, Worcester, MA, Aug. 1999, pp. 292-302, Aug. 1999.
"Preventing SPA/DPA in ECC Systems Using the Jacobi Form", P.-Y. Liardet, et al. pp. 391-401, May 14-16, 2001.
"Elliptic Curves in Cryptography", I.F. Black, et al., London Mathematical Society Lecture Note Series.265, Cambridge University Press, pp. 62-73, 1999.
"Protections Against Differential Analysis for Elliptic Curve Cryptography", Marc Joye, et al., Cryptographic Hardware and Embedded Systems, Cetin K. Koc David Naccache Christof Paar (Eds.), Third International Workshop, pp. 377-390, May 14-16, 2001.
"Random Register Renaming to Foil DPA", D. May, et al., Cryptographic Hardware and Embedded Systems-CHES 2001, Cetin K. Koc David Naccache Christof Paar (Eds.), Third International Workshop, pp. 28-38, May 14-16, 2001.
"A Practical Countermeasure Against Address-bit DPA", Tetsuya Izu et al., The 2003 Symposium on Cryptography and Information Security Hamamatsu, Japan, Jan. 26-29, 2003, The Institute of Electronics, pp. 689-694.

(Continued)

*Primary Examiner*—Longbit Chai
(74) *Attorney, Agent, or Firm*—Staas & Halsey LLP

(57) ABSTRACT

An encryption device performs elliptic curve encryption using a secret key. The encryption device includes an operation unit for performing scalar multiplication of a point on an elliptic curve a storage unit having a plurality of data storing areas and a determiner unit for determining, in accordance with a bit sequence of a given value (d) and with a random value (RNG), an address of one of the plurality of data storage areas that is to be coupled to the operation means for each scalar multiplication.

22 Claims, 24 Drawing Sheets

OTHER PUBLICATIONS

"On Assumptions of Implementational Attacks and Their Practicality", Katsuyuki Okeya, et al., The 2003 Symposium on Cryptography and Information Security Hamamatsu, Japan, Jan. 26-29, 2003, The Institute of Electronics, pp. 539-544.

"Use of Elliptic Curves in Cryptography", Victor S. Miller, Section VI Randomness and Other Problems, Exploratory Computer Science, IBM Research, Yorktown Heights, NY 10598, pp. 417-426, Springer-Verlag, 1999.

"A Fast Parallel Elliptic Curve Multiplication Resistant Against Side Channel Attacks", Tetsuya Izu, et al., D. Naccache and P. Paillier (Eds.): PKC 2002, LNCS 2274, pp. 280-296.

"Address-Bit Differential Power Analysis of Cryptographic Schemes OK-ECDH and OK-ECDSA", Kouichi Itoh, et al., B.S. Kaliski Jr. et al. (Eds.): CHES 2002, LNCS 2523, pp. 129-143.

"Universal Exponentiation Algorithm A First Step Towards Provable SPA-Resistance", Christophe Clavier, et al., C.K. Koc, D. Naccache, and C. Paar (Eds.): CHES 2001, LNCS 2162, pp. 300-308.

"DPA Countermeasures by Improving the Window Method", Kouichi Itoh, et al., B.S. Kaliski Jr. et al. (Eds.): CHES 2002, LNCS 2523, pp. 303-317.

"Differential Power Analysis", Paul Kocher, et al., Michael Wiener (Ed.): CRYPTO'99, LNCS 1666, pp. 388-397, 1999.

"Power Analysis Attacks of Modular Exponentiation in Smartcards", Thomas S. Messerges, et al., C.K. Koc and C. Paar (Eds.): CHES'99, LNCS 1717, pp. 144-157, 1999.

Handbook of Applied Cryptography by A. Menezes, et al., 1997, Section 14.6 Exponentiation, pp. 615-616.

Supplementary European Search Report, mailed Feb. 29, 2008 and issued in corresponding European Patent Application No. 02786146.7-2212.

* cited by examiner

```
·input
d : exponent
u : MSB of d
A : point
·output
V=dA

/* make k-bit window W[x] = xA for 0<x<2^k */
W[1]=A;
for(i=2;i<2^k;i++) W[i] = W[i-1] + A;

V=O;
for(i=⌈u/k⌉-1;i>=0;i=i-1) {
/* extract top k-bit of d */
  b_i= (d_{i+k-1}, ..., d_{i+1}, d_i)_2
  if (b_i ≠ 0) V = V+W[b_i];
/* V = 2^k V */
if (i>0)
for (j=0;j<k;j++) V=2V;
}
return V;
``` where ⌈u/k⌉ = ceiling (u/k)

FIG. 2

Example of Algorithm 5 or Algorithm 5'

Example of Algorithm 6 or Algorithm 6'

Example of Algorithm 7 or Algorithm 7'

Example of Algorithm 9 or Algorithm 9'

PRIOR ART

Example of Algorithm 9 or Algorithm 9'

Block Diagram of Algorithm 10 or Algorithm 10'

Block Diagram
of Algorithm13 or Algorithm 13'

Block Diagram
of Algorithm 13 or Algorithm 13'

TAMPER-PROOF ELLIPTIC ENCRYPTION WITH PRIVATE KEY

CROSS REFERENCE TO RELATED APPLICATIONS

This application is a Continuation of PCT Application No. PCT/JPO2/13269, now pending, filed Dec. 18, 2002 with the PCT, the disclosures of which are incorporated herein by reference.

FIELD OF THE INVENTION

The present invention relates generally to the field of cryptography, and more particularly to tamper-proof encryption/decryption with provisions for preventing power analysis attacks, such as SPA and DPA, in a processor for elliptic curve cryptography.

BACKGROUND OF THE INVENTION

Encryption systems generally include public key cryptosystems and common key cryptosystems. Public key cryptosystems use different keys for decryption and encryption, respectively. Typically, a plaintext is encrypted with a public key, and a ciphertext is decrypted with a secret key, to thereby provide secure transmission of the ciphertext. Alternatively, the plaintext may be encrypted with a secret key, and the ciphertext may be decrypted with a public key, to thereby identify the user who encrypted the plaintext. FIG. 1 shows an exemplary configuration of encryption/decryption using a secret key in an encryption device, such as a smartcard. In FIG. 1, an internal encryption/decryption unit of the encryption device processes an input plaintext/ciphertext message using a secret key in a known manner to produce an output ciphertext/plaintext message.

In a processor for the elliptic curve cryptography which is one type of public key encryption, scalar multiplication is used. In the scalar multiplication of a point, a point R that satisfies the equation $V=dA$, is determined for a scalar value d and a point A on an elliptic curve. For example, for the Diffie-Hellman key distribution in the elliptic curve cryptography, the point represented by $V=dA$ is produced through scalar multiplication by a secret key d.

For scalar multiplication of a point in the binary method, a value V is determined by performing point doubling and point addition in the order from the MSB (most significant bit) to the LSB (least significant bit) of a binary value d. In order to determine a value V for $d=21=2^4+2^2+2^0=(10101)_2$ for example, for the MSB "1", the value A is added to the initial value $V=O$ (a point at infinity) to produce a value $V=A$, then for the next significant bit "0", the resultant value V is multiplied by 2 to generate a value $V=A\times 2$, then for the next significant bit "1", the resultant value V is multiplied by 2 and A is added to the product to produce a value $V=(A\times 2)\times 2+A$, then for the next significant bit "0", the resultant value V is multiplied by 2 to produce a value $V=((A\times 2)\times 2+A)\times 2$, and then for the LSB "1", the resultant value V is multiplied by 2 and A is added to the product to produce a value $V=(((A\times 2)\times 2+A)\times 2)\times 2+A=(2^4+2^2+2^0)A$.

A window method for the efficient modular exponentiation is known. The window method is described in Alfred J. Menezes et al., "HANDBOOK OF APPLIED CRYPTOGRAPHY" (CRC press), p. 615, Algorithm 14.82.

FIG. 2 shows an algorithm for determining a scalar multiplication of a point, $V=dA$, in the elliptic curve cryptography using the window method, where d is expressed as $d=(d_{u-1}, d_{u-1}, \ldots d_0)_2$ in binary representation. The algorithm is written in the C language.

Now, the algorithm of FIG. 2 is explained below. First, it generates a table W of values W's that satisfy $W[x]=xA$ for all integers x's such that $0<x<2^k$. After generating the table W, the u-bit value $d=(d_{u-1}, d_{u-1}, \ldots d_0)_2$ is divided into m k-bit sequences $b_i=(di_{k+k-1}, \ldots di_k)_2$ ($i=0, 1, 2, \ldots$), where $m=\text{ceiling}(u/k)$. An addition $V=V+W[b_i]$ by looking up the value $W[b_i]$ ($=b_iA$) for $b_i$ in the table W, and a multiplication by $2^k$ expressed as $V=2^kV$ are performed in order for the most significant sequence $b_{m-1}$ through the least significant sequence $b_0$, to thereby determine $V=dA$.

Decryption (analysis) or tampering is attempted by guessing secret information, including the secret key, from available information such as a ciphertext. Power analysis attack which is one form of decryption was devised in 1998 by Paul Kocher. In this power analysis attack, different pieces of input data are provided to the encryption processor included in an encryption device such as a smartcard. During this process, changes in power dissipation over time are measured using an oscilloscope or the like, for example, as shown in FIG. 1, and a statistically sufficient number of power dissipation curves are collected and analyzed to guess key information held within the encryption processor. This power analysis attack can be applied to both of the common key encryption and the public key encryption.

The power analysis attacks include simple power analysis (SPA) and differential power analysis (DPA). The SPA guesses the secret key from the characteristic of a single power dissipation curve taken from the encryption processor. The DPA guesses the secret key by analyzes the differences between many different power dissipation curves (hereinafter referred to as the power difference curves). Generally, the DPA is more powerful than SPA.

For example, SPA and DPA for common key cryptosystems, such as DES (Data Encryption Standard) and AES (Advanced Encryption Standard), are disclosed in Paul Kocher, Joshua Jaffe, and Benjamin Jun, "Differential Power Analysis", in proceedings of Advances in Cryptology-CRYPTO '99, Lecture Notes in Computer Science, vol. 1666, Springer-Verlag, 1999, pp. 388-397.

SPA and DPA for public key cryptosystems, such as RSA encryption and elliptic curve encryption, are disclosed in, for example, Thomas S. Messerges, Ezzy A. Dabbish, and Robert H. Sloan, "Power Analysis Attacks of Modular Exponentiation in Smartcards", Cryptographic Hardware and Embedded Systems (CHES '99), Lecture Notes in Computer Science Vol. 1717, Springer-Verlag, pp. 144-157 (Messerges '99), and Jean-Sebastein Coron "Resistance against Differential Power Analysis for Elliptic Curve Cryptosystems", Cryptographic Hardware and Embedded Systems (CHES '99), Lecture Notes in Computer Science Vol. 1717, Springer-Verlag, pp. 292-302, 1999 (Coron '99).

The elliptic curve cryptosystem is based on the elliptic curve discrete logarithm problem, and was proposed in N. Koblitz ("Elliptic Curve Cryptosystems", Mathematics of Computers, Vol. 48, pp. 203-209, 1987.) and V. Miller ("Use of elliptic curves in cryptography", Advances in Cryptology-Proceedings of Crypto '85, Lecture Notes in Computer Science, 218 (1986), Springer-Verlag, pp. 417-426).

The elliptic curve encryption is an arithmetic operation based on scalar multiplication of a point on an elliptic curve. For example, a public key point P lies on an elliptic curve, which is calculated for a publicized point G, called the base point, on the elliptic curve by performing scalar multiplication $P=dG$ of the point G on the elliptic curve by a secret key d which is a scalar value. In key sharing between two parties A and B in accordance with the Diffie-Hellman key sharing scheme using an elliptic curve, the relationship $X=d_A P_B=d_B P_A$ is used, where $d_A$ and $P_A$ represent a pair of the secret key and public key of A, and $d_B$ and $P_B$ represent a pair of the secret key and public key of B. Scalar multiplication of a point on an elliptic curve is done by repeating the "point addition (ECADD)" and the "point doubling (ECDBL)". The simplest implementations of the scalar multiplication R=dQ include the binary method (MSB) and binary method (LSB) shown in the following basic Algorithms 1 and 2. In the following description, lower cases (d, etc.) represent scalar values, and upper cases (R, Q, etc.) represent points on the elliptic curve, unless specifically noted otherwise.

<Algorithm 1: Binary Method (MSB)>

```
T := Q
for i = n-2 downto 0 {
   T := ECDBL(T)
   if (di == 0) {
      T := ECADD(T, Q)         ...*
   }
}
R := T,
where T is a temporary variable, d is an n-bit scalar value,
di is the i-th LSB of the value d.
        <Algorithm 2: Binary Method (LSB)>
T[1] := Q
T[0] := O
for i = 0 upto n-1 {
   if (di == 1) {
      T[0] := ECADD(T[0], T[1])    ...*
   }
   T[1] := ECDBL(T[1])
}
R := T[0],
``` where registers T[0] and T[1] are temporary variables, d is an n-bit scalar value, and di is the i-th LSB of the value d.

When Algorithms 1 and 2 are used for the scalar multiplication of a point, the operation indicated by "*" is performed or not performed, depending on the value of each bit within the secret key value d. The SPA analyzes the secret key d based on this dependency. From many experiments, it is known that the power waveforms observed in the ECDBL operation and the ECADD operation exhibit respective distinctive characteristics and are easily distinguishable. Accordingly, by measuring the power waveforms generated during the operations of Algorithms 1 and 2 in the processor, the secret key d can be determined in accordance with the variations of the order of the ECDBL and ECADD operations and the number of occurrences of these operations determined through analysis of the waveforms.

As a countermeasure against the SPA, a method called add-and-double-always is proposed in Coron '99. This method is secure against the SPA, because the ECADD and ECDBL operations are always performed alternately. Algorithms which are formed by applying the add-and-double-always operation to Algorithms 1 and 2 are shown as Algorithms 3 and 4 below.

<Algorithm 3: Binary Method (MSB, add-and-double-always)>

```
T[0] := Q
for i = n-2 downto 0 {
   T[0] := ECDBL(T[0])
   T[1] := ECADD(T[0], Q)
   T[0] := T[di]
}
R := T[0],
``` where registers T[0] and T[1] are temporary variables, d is an n-bit scalar value, and di is the i-th LSB of the value d.

<Algorithm 4: Binary Method (LSB, add-and-double-always)>

```
T[0] := O
T[2] := Q
for i = 0 upto n-1 {
   T[1] := ECADD(T[0], T[2])
   T[2] := ECDBL(T[2])
   T[0] := T[di]
}
R := T[0],
``` where registers T[0] and T[1] are temporary variables, d is an n-bit scalar value, and di is the i-th LSB of the value d.

The SPA can be prevented by using Algorithms 3 and 4. However, Coron '99 also describes the DPA for these algorithms, and shows that, Algorithms 3 and 4 can determine the secret key through analysis. Further, Coron '99 proposes a countermeasure against the DPA against Algorithms 3 and 4 by introducing representation of a point on an elliptic curve using a random value or number, called randomized projective coordinates (RPC). Algorithms which are formed by applying the RPC to Algorithms 3 and 4 are shown below as Algorithms 5 and 6, respectively. Each point represented by the RPC on the elliptic curve is indicated by a variable with a prime (').

<Algorithm 5: Binary Method (MSB, add-and-double-always, RPC)>

```
T'[2] := RPC(Q)
T'[0] := T'[2]
for i = n-2 downto 0 {
   T'[0] := ECDBL(T'[0])
   T'[1] := ECADD(T'[0], T'[2])
   T'[0] := T'[di]
}
R ← T'[0],
``` where registers T'[0], T'[1] and T'[2] are temporary variables, d is an n-bit scalar value, di is the i-th LSB of the value d, and the symbol "←" represents the inverse transform of the RPC representation.

FIG. 3 shows a flow diagram of Algorithm 5 which is executed by the processor or encryption/decryption unit as shown in FIG. 1. FIG. 4 shows a block diagram implementing Algorithm 5.

Referring to FIG. 3, at Step 302, the processor assigns or stores the RPC-transformed coordinate value of a point Q into the register T[2]. At Step 304, the processor assigns the value of the register T[2] into the register T[0]. Step 306 is a looping process for a variable i=(n−1), (n−2), . . . , 0. At Step 308 within Step 306, the processor performs the ECDBL operation (point doubling) on the value of the register T[0], and assigns the resultant doubled value or product back into the register T[0]. At Step 310, the processor performs the ECADD operation (point addition) on the value of the register T[0] with the value of the register T[2], and assigns the resultant sum into the register T[1]. At Step 312, the processor assigns the value of the register T[di] into the register T[0] in accordance with the value di of the i-th LSB of the key. Step 312 can become a target of the address-bit DPA. At Step 314, the processor sets i=i−1. After that, the procedure returns to Step 308. After performing Step 306 for i=(n−1), (n−2), ..., 0, the processor at Step 316 performs the inverse RPC (RPC$^{-1}$) transform on the value of the register T[0] and provides the inverse transformed value as an output.

<Algorithm 6: Binary Method (LSB, add-and-double-always, RPC)>

```
T'[0] := O
T'[2] := RPC(Q)
for i = 0 upto n−1 {
    T'[1] := ECADD(T'[0], T'[2])
    T'[2] := ECDBL(T'[2])
    T'[0] := T'[di]
}
R ← T'[0],
``` where registers T'[0], T'[1] and T'[2] are temporary variables, d is an n-bit scalar value, di is the i-th LSB of the value d, and "←" represents the inverse transform of the RPC representation.

FIG. 5 shows a flow diagram of Algorithm 6 which is executed by the processor or encryption/decryption unit as shown in FIG. 1. FIG. 6 shows a block diagram implementing Algorithm 6.

Referring to FIG. 5, at Step 502, the processor assigns the coordinate value of a point 0 into the register T[0]. At Step 504, the processor assigns the RPC-transformed coordinate value of point Q into the register T[2] Step 506 is a looping process for the variable i=0, 1, ..., (n−1). At Step 508 within Step 506, the processor performs the ECADD operation on the value of the register T[0] with the value of the register T[2], and assigns the resultant sum into the register T[1]. At Step 510, the processor performs the ECDBL operation on the value of the register T[2], and assigns the resultant doubled value back into the register T[2]. At Step 512, the processor assigns the value of the register T[di] into the register T[0] in accordance with the value di of the i-th LSB of the key. Step 512 can become a target of the address-bit DPA. At Step 514, the processor sets i=i+1. After that, the procedure returns to Step 508. After performing Step 506 for i=0, 1, ..., (n−1), the processor at Step 516 performs the inverse RPC (RPC$^{-1}$) transform on the value of the register T[0] and provides the inverse transformed value as an output.

Coron '99 describes that the SPA and DPA can be prevented by using Algorithms 5 and 6. As a method having a similar effect, a method which uses both of the RPC and the SPA-resistant Montgomery-Ladder is proposed in T. Izu, and T. Takagi, "A Fast Parallel Elliptic Curve Multiplication Resistant against Side Channel Attacks", PKC 2002, LNCS 2274, pp. 280-296, Springer-Verlag, 2002 (Izu-Takagi). This method is characterized by the use of a scalar multiplication, called the Montgomery-Ladder, which takes the SPA countermeasure, rather than the binary method which uses the add-and-double-always (Algorithms 3 and 4). In the scalar multiplication R=dQ, the Montgomery-Ladder computes two points such that their difference is 1Q, by always performing the ECADD and ECDBL operations. The scalar multiplication which uses the SPA-resistant Montgomery-Ladder and the RPC in combination is shown below as Algorithm 7.

<Algorithm 7: Montgomery-Ladder (SPA-Countermeasure, RPC)>

```
T'[0] := RPC(Q)
T'[1] := ECDBL(T'[0])
for i = n−2 downto 0 {
    T'[2] := ECDBL(T'[di])        ...*
    T'[1] := ECADD(T'[0], T'[1])
    T'[0] := T'[2 − di]            ...#
    T'[1] := T'[1 + di]            ...#
}
R ← T'[0],
``` where registers T'[0], T'[1] and T'[2] are temporary variables, d is an n-bit scalar value, di is the i-th LSB of the value d, and "←" represents the inverse transform of the RPC representation.

FIG. 7 shows a flow diagram of Algorithm 7 which is executed by the processor or encryption/decryption unit as shown in FIG. 1. FIG. 8 shows a block diagram implementing Algorithm 7.

Referring to FIG. 7, at Step 702, the processor assigns the RPC-transformed coordinate value of a point Q into the register T[0]. At Step 704, the processor performs the ECDBL operation on the value of the register T[0], and assigns the resultant doubled value into the register T[1]. Step 706 is a looping process for the variables i=(n−2), (n−1), ..., 0. At Step 708 within Step 706, the processor performs the ECDBL operation on the value of the register T[di] in accordance with the value di of the i-th LSB of the key, and assigns the resultant product into the register T[2]. At Step 710, the processor performs the ECADD operation on the value of the register T[0] with the value of the register T[1], and assigns the resultant sum into the register T[10]. At Step 712, the processor assigns the value of the register T[2-di] into the register T[0] in accordance with the value di of the i-th LSB of the key. At Step 714, the processor assigns the value of the register T[1+di] into the register T[1] in accordance with the value di of the i-th LSB of the key. Steps 708, 712 and 714 can become targets of the address-bit DPA. At Step 716, the processor sets i=i−1. After that, the procedure returns to Step 708. After performing Step 706 for i=(n−2), (n−1), ..., 0, the processor at Step 718 performs the inverse RPC(RPC$^{-1}$) transform on the value of the register T[0] and provides the inverse transformed value as an output.

As a method having an effect similar to that of the RPC, a randomized curve (RC) method is proposed in M. Joye, and C. Tymen, "Protections against differential analysis for elliptic curve cryptography", CHES 2001, LNCS 2162, pp. 377-390, Springer-Verlag, 2001 (JT 01). Like the RPC, the RC is a countermeasure against the DPA and uses a random value to represent a point on an elliptic curve. The way of applying the RC is the same as that of applying the RPC. Algorithms 5 and 6, and Algorithm 7 in which the RC is used instead of the RPC are shown below as Algorithms 5' and 6', and Algorithm 7' by suffixing "'". Each point expressed by the RC on the elliptic curve is shown by a variable with suffixed with "'".

<Algorithm 5': Binary Method (MSB, add-and-double-always, RC)>

```
T"[2] := RC(Q)
T"[0] := T"[2]
for i = n–2 downto 0 {
    T"[0] := ECDBL(T"[0])
    T"[1] := ECADD(T"[0], T"[2])
    T"[0] := T"[di]
}
R ← T"[0],
``` where registers T'[0], T'[1] and T'[2] are temporary variables, d is an n-bit scalar value, di is the i-th LSB of the value d, and "←" represents the inverse transform of the RC representation.

FIG. 4 is also a block diagram implementing Algorithm 5'.

<Algorithm 6': Binary Method (LSB, add-and-double-always, RC)>

```
T"[0] := O
T"[2] := RC(Q)
for i = 0 upto n–1 {
    T"[1] := ECADD(T"[0], T"[2])
    T"[2] := ECDBL(T"[2])
    T"[0] := T"[di]
}
R ← T"[0],
``` where registers T"[0], T"[1] and T"[2] are temporary variables, d is an n-bit scalar value, di is the i-th LSB of the value d, and "←" represents the inverse transform of the RC representation.

FIG. 6 is also a block diagram implementing Algorithm 6'.

<Algorithm 7': Montgomery-Ladder (SPA-Countermeasure, RC)>

```
T"[0] := RC(Q)
T"[1] := ECDBL(T"[0])
for i = n–2 downto 0 {
    T"[2] := ECDBL(T"[di])         ...*
    T"[1] := ECADD(T"[0], T"[1])
    T"[0] := T"[2 – di]            ...#
    T"[1] := T"[1 + di]            ...#
}
R ← T"[0],
``` where registers T"[0], T"[1] and T"[2] are temporary variables, d is an n-bit scalar value, di is the i-th LSB of the value d, and "←" represents the inverse transform of the RC representation.

FIG. 8 is also a block diagram implementing Algorithm 7'.

As described above, the methods for implementing the scalar multiplication R=dQ include a method known as the window method as well as Algorithms 1 and 2. For example, in a 4-bit window method, the zeroth to 15th multiples of Q are computed and the resultant values are stored in a table in the initializing process, and the secret key is processed on a 4-bit-window basis. The following Algorithm 8 is the most basic algorithm for implementing the 4-bit window method.

<Algorithm 8: Window Method (4-Bits)>

```
W[0] = O
W[1] = Q
W[2] = ECDBL(Q)
for i = 3 upto 15 {
    W[i] = ECADD(W[i–1], Q)
}
R := W[d_{n–1, n–4}]
for i = n–5 downto 0 step –4 {
    R := ECDBL(R)
    R := ECDBL(R)
    R := ECDBL(R)
    R := ECDBL(R)
    R := ECADD(R, W[d_{i, i–3}])
},
``` where d is an n-bit scalar value, it is assumed that n is a multiple of a value of 4 for simplicity, $d_{i,i-3}$ is a 4-bit value of the i-th to (i–3)-th bits of the value d, and W[i] represents a table for the window method.

When Algorithm 8 is used for the scalar multiplication of a point, there are no such operations that are performed or not performed depending on the bit value in d. Thus, generally the window method, unlike the binary method, is considered to be secure against the SPA. However, the window method, like the binary method, is not secure against the DPA, and can be analyzed by the technique of Coron '99, but it is known that, for the window method as well as the binary method, the RPC and RC are effective as countermeasures against the DPA. Algorithms which are formed by applying the RPC and RC to Algorithm 8 are shown below as Algorithms 9 and 9', respectively.

<Algorithm 9: Window Method (4-Bit, RPC)>

```
W'[0] = O
W'[1] = RPC(Q)
W'[2] = ECDBL(W'[1])
for i = 3 upto 15 {
    W'[1] = ECADD(W'[i–1], W'[1])
}
R' := W'[d_{n–1,n–4}]
for i = n–5 downto 0 step –4 {
    R' := ECDBL(R')
    R' := ECDBL(R')
    R' := ECDBL(R')
    R' := ECDBL(R')
    R' := ECADD(R', W'[di, _{i–3}])      ...*
}
R ← R',
``` where d is an n-bit scalar value, it is assumed that n is a multiple of a value of 4 for simplicity, $d_{i,i-3}$ is a 4-bit value of the i-th to (i–3)-th bits of the value d, R', Q'T[0] and T'[1] are temporary variables, W[i] represents a table for the window method, and "←" represents the inverse transform of the RPC representation.

<Algorithm 9': Window Method (4-Bit, RC)>

```
W"[0] = O
W"[1] = RC(Q)
W"[2] = ECDBL(W"[1])
for i = 3 upto 15 {
    W"[i] = ECADD(W"[i–1], W"[1])
}
R" := W"[d_{n–1,n–4}]
for i = n–5 downto 0 step –4 {
```

-continued

```
    R" := ECDBL(R")
    R" := ECDBL(R")
    R" := ECDBL(R")
    R" := ECDBL(R")
    R" := ECADD(R", W"[d_{i, i-3}])        ...*
}
R ← R',
``` where d is an n-bit scalar value, it is assumed that n is a multiple of a value of 4 for simplicity, and $d_{i,i-3}$ is a 4-bit value of the i-th to (i−3)-th bits of the value d, and where R", Q", T"[0] and T[1] are temporary variables, W"[i] represents a table for the window method, and "←" represents the inverse transform of the RC representation.

FIGS. 9 and 10 show respective flow diagrams of Algorithms 9 and 9' which are executed by the processor or encryption/decryption unit as shown in FIG. 1. FIGS. 11 and 12 show block diagrams implementing Algorithms 9 and 9'.

Referring to FIGS. 9 and 10, at Step 902, the processor assigns the coordinate value of a point 0 into the table W[0]. At Step 904, the processor assigns the RPC-transformed coordinate value of a point Q into the table W[1]. At Step 906, the processor performs the ECDBL operation on the value of the table W[1], and assigns the resultant product into the table W[2]. Step 908 is a looping process for the variables i=3, 4, . . . 15. At Step 910, the processor performs the ECADD operation on the value of the table W[i−1] with the value of the table W[1], and assigns the resultant sum into the table W[i]. At Step 912, the processor sets i=i+1. At Step 914, the processor assigns the value of the table $W[d_{n-1, n-4}]$ into R in accordance with the values $d_{n-1, n-4}$ of the (n−1)-th, (n−2)-th, . . . (n−4)-th bits of the key.

Step 916 is a looping process for the variables i=(n−5), (n−6), . . . 0. Step 918 within Step 916 is a loop which is repeated to execute the process at four times or for four rounds. At Step 920, the processor performs the ECDBL operation on the value of the register R, and assigns the resultant product into R. Step 920 is repeated to be executed four times. At Step 922, the processor performs the ECADD operation on the value of the table $W[d_{i, i-3}]$ with the value of the register R in accordance with the values $d_{i, i-3}$ of the i-th to (i−3)-th bits of the key, and assigns the resultant sum into the register R. Step 922 can become a target of the address-bit DPA. At Step 924, the processor sets i=i−4. After that, the procedure returns to Step 918. After performing Step 924 for i=(n−5), (n−6), . . . 0, the processor at Step 926 performs the inverse RPC($RPC^{-1}$) transform on the value of the register R and provides the inverse transformed value as an output.

Conventionally, it has been considered that Algorithms 5 to 7, Algorithms 5' to 7', and Algorithms 9 and 9' provide security against the SPA and DPA. However, a technique for analyzing Algorithm 7 has been published in K. Itoh, T. Izu, and M. Takenaka "Address-bit Differential Power Analysis of Cryptographic Schemes OK-ECDH and OK-ECDSA", Cryptographic Hardware and Embedded Systems (CHES 2002), Pre-proceeding, pp. 129-143 (hereinafter called IIT 02). While the conventional DPA (data-bit DPA) focuses on the power dissipation variations associated with data changes, the address-bit DPA is an analysis technique that focuses on the power dissipation variations associated with address changes.

For example, in the operation d indicted by "*" in Algorithm 7, whether either of T'[0] and T'[1] is used is determined in accordance with the value of di. Thus, the address, at which the data used for the ECDBL operation is stored, is correlated with di. A similar situation occurs in the operation indicated by "#". The address-bit DPA can use the correlation to analyze the secret key information d.

In the document IIT 02 above, the address-bit DPA is performed for the Montgomery-Ladder (Algorithm 7), but similar analysis can be applied to Algorithms 5, 6, and 5' to 7'. Also in Algorithms 9 and 9', there is a high degree of correlation between the value of the secret key information d and the table used for it in the operation indicated by "*", and hence it is appreciated that a similar attack is applicable to them. Thus, Algorithms 5 to 7, Algorithms 5' to 7', and Algorithms 9 and 9' may not be secure against the DPA if the address-bit DPA is used for analysis.

The document IIT 02 describes countermeasures against the address-bit DPA. The countermeasures described in IIT 02 are implemented by applying, to Algorithms 5 to 7, techniques of randomly changing the scalar values, such as the exponent-blinding proposed in Coron '99, and Messerges '99; the exponent-splitting proposed in C. Clavier, and M. Joye, "Universal exponentiation algorithm—A first step towards provable SPA-resistance—", Cryptographic Hardware and Embedded Systems (CHES 2001), and Lecture Notes in Computer Science vol. 2162, Springer-Verlag, pp. 300-308 (CJ 01); and the overlapped window method proposed in J. Yajima, K. Itoh, M. Takenaka, and N. Torii "DPA countermeasure by improving the window method", Cryptographic Hardware and Embedded Systems (CHES 2002), and Pre-proceeding, pp. 304-319 (YIIT 02).

SUMMARY OF THE INVENTION

In accordance with an aspect of the present invention, an encryption device performs elliptic curve encryption using a secret key. The encryption device includes: operation means for performing scalar multiplication of a point on an elliptic curve; storage having a plurality of data storing areas; and means for determining, in accordance with a bit sequence of a given value d and with a random value, an address of one of the plurality of data storage areas that is to be coupled to the operation means for each scalar multiplication.

In accordance with another aspect of the present invention, a program (which may be stored on an storage medium) for use in an information processing apparatus and for performing elliptic curve encryption using a secret key is operable to execute the step of determining a product of scalar multiplication of a point on an elliptic curve; and the step of determining, in accordance with a bit sequence of a given value d and with a random value, an address of one of a plurality of data storage areas that is to be used for each scalar multiplication.

In accordance with a further aspect of the present invention, in an information processing apparatus, a method for performing elliptic curve encryption using a secret key comprises a step of determining a product of scalar multiplication of a point on an elliptic curve; and a step of determining, in accordance with a bit sequence of a given value d and with a random value, an address of one of a plurality of data storage areas that is to be used for each scalar multiplication.

Throughout the drawings, similar symbols and numerals indicate similar items and functions.

BRIEF DESCRIPTION OF THE DRAWINGS

FIG. 2 shows an algorithm for determining a scalar multiplication of a point using the window method;

DETAILED DESCRIPTION OF THE PREFERRED EMBODIMENTS

Each of these individual techniques described above, however, have countermeasures to the SPA, the data-bit DPA and the address-bit DPA, and hence it is redundant to apply these techniques to Algorithms 5 to 7 which have the countermeasures against the SPA and the data-bit DPA. In particular, application of these techniques requires the operations of addition and doubling of points on the elliptic curve to be performed a larger number of times than would be the case if they were not applied, resulting in increased overhead to be processed, which is a drawback.

The inventors have recognized the need for achieving efficient and tamper-proof scalar multiplication of a point.

An object of the present invention is to enhance the security of encryption by making it difficult to guess a secret key.

Another object of the invention is to provide efficient tamper-proof scalar multiplication of a point.

A further object of the present invention is to provide efficient tamper-proof scalar multiplication of a point that is secure against the address-bit DPA.

According to the invention, it becomes difficult to guessing a secret key, to thereby enhance the security of the encryption processing and provide efficient tamper-proof scalar multiplication of a point.

There is a problem in Algorithm 7 described above such that, in the operation indicated by "*", the storage address of the variable register T'[x] changes depending on the secret or private key di. Thus, the register T'[0] is used for di=0 and the register T'[1] is used for di=1, and hence the key can be analyzed and determined by the address-bit DPA. Accordingly, if the value of di and the variables T'[0] and T'[1] to be used are adapted to randomly change, the key cannot be analyzed by the address-bit DPA. This also applies to the operation indicated by "#".

Figures 13A, 13B:
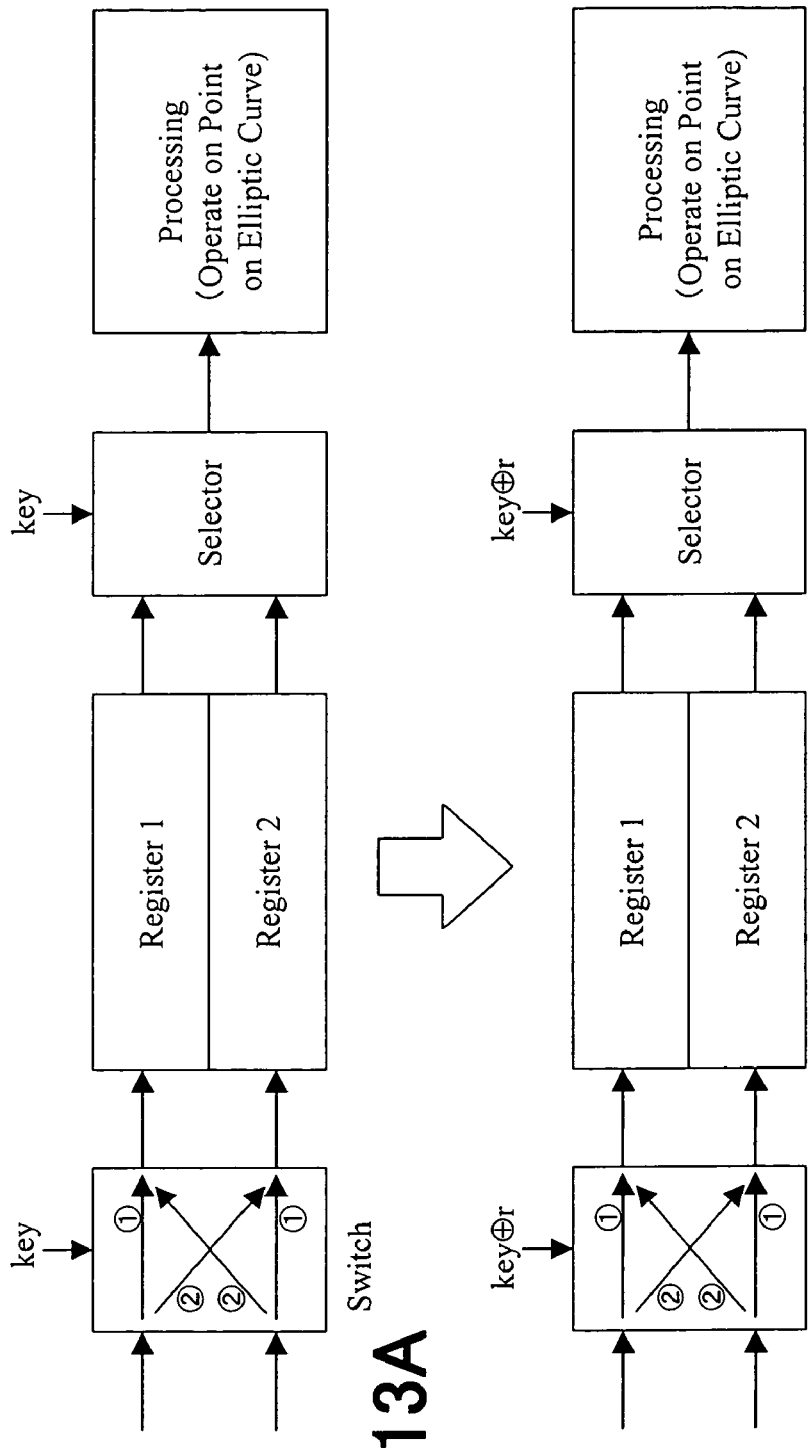
FIGS. 13A and 13B are useful for explaining the principles of the present invention.

FIGS. 13A and 13B are useful for explaining the principles of the present invention. An input value is provided to and stored in either one of two registers 1 and 2 via a switch controlled in accordance with the bit sequence of the key. The order of the registers in which the value is to be stored changes or the register to be used is determined conventionally in accordance with the bit sequence of the key, as shown in FIG. 13A. This is prevented by the present invention, the register to store a value to be operated is determined in accordance with XORing (Exclusive OR) the key value with a random value, as shown in FIG. 13B, rather than the key value alone, to thereby provide encryption processing which has high resistance to the address-bit DPA.

Algorithms which are formed by introducing random values into the operations indicated by "*" and "#" into Algorithms 7 and 7' are shown below as Algorithms 10 and 10', respectively, in accordance with embodiments of the invention. The method of the invention which randomly determines the variables is referred to as randomized addressing (RA).

<Algorithm 10: Montgomery-Ladder (SPA-Countermeasure, RPC, RA)>

$$T'[r_{n-1}] := RPC(Q)$$
$$T'[1 - r_{n-1}] := ECDBL(T'[r_{n-1}])$$
for i = n−2 downto 0 {
  $T'[2] := ECDBL(T'[di \oplus r_{i+1}])$  ...*
  $T'[1] := ECADD(T'[0], T'[1])$
  $T'[0] := T'[2 - (di \oplus r_i)]$  ...#
  $T'[1] := T'[1 + (di \oplus r_i)]$  ...#
}
$R \leftarrow T'[r_0]$, where T'[0], T'[1] and T'[2] are temporary variables, d is an n-bit scalar value, di is the i-th LSB of the value d, r represents an n-bit random value, $r_i$ is the i-th LSB of the value r, and "←" represents the inverse transform of the RPC representation.

<Algorithm 10': Montgomery-Ladder (SPA-Countermeasure, RC, RA)>

$$T''[r_{n-1}] := RP(Q)$$
$$T''[1 - r_{n-1}] := ECDBL(T''[r_{n-1}])$$
for i = n−2 downto 0 {
  $T''[2] := ECDBL(T''[di \oplus r_{i+1}])$  ...*
  $T''[1] := ECADD(T''[0], T''[1])$
  $T''[0] := T''[2 - (di \oplus r_i)]$  ...#
  $T''[1] := T''[1 + (di \oplus r_i)]$  ...#
}
$R \leftarrow T''[r_0]$, where T"[0], T"[1] and T"[1] are temporary variables, d is an n-bit scalar value, di is the i-th LSB of the value d, r represents an n-bit random value, $r_i$ is the i-th LSB of the value r, and "←" represents the inverse transform of the RC representation.

In Algorithms 10 and 10', the operation indicated by "*" uses an index which is an XOR of the secret key d with the random value r, and hence which one of the variable registers, T'[0] or T'[1], is to be used is determined independently of the secret key d. Similarly, each of the operations indicated by "#" uses an index which is independent of the secret key d. Accordingly, Algorithms 10 and 10' are secure against the address-bit DPA. In relation to the overhead, the number of operations (ECDBL and ECADD) on a point on the elliptic curve in Algorithms 10 and 10' is equal to that in Algorithms 7 and 7', and the added portion is only the index in the operation indicated by "*". Thus the added overhead portion in Algorithms 10 and 10' is slight.

Figure 1:
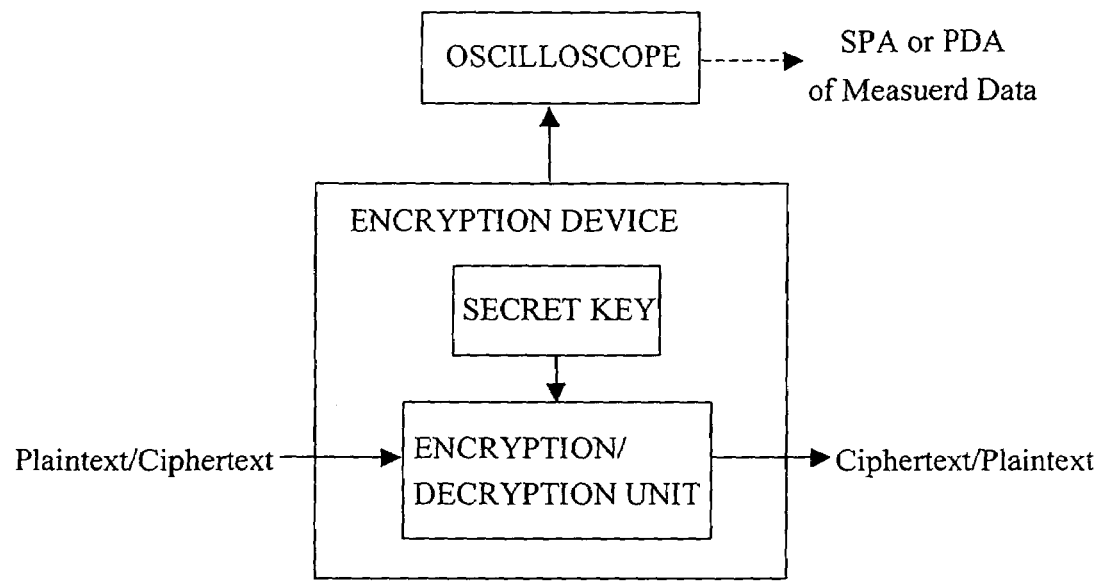
FIG. 1 shows an exemplary configuration of encryption/decryption using a secret key in an encryption device.
Figure 3:
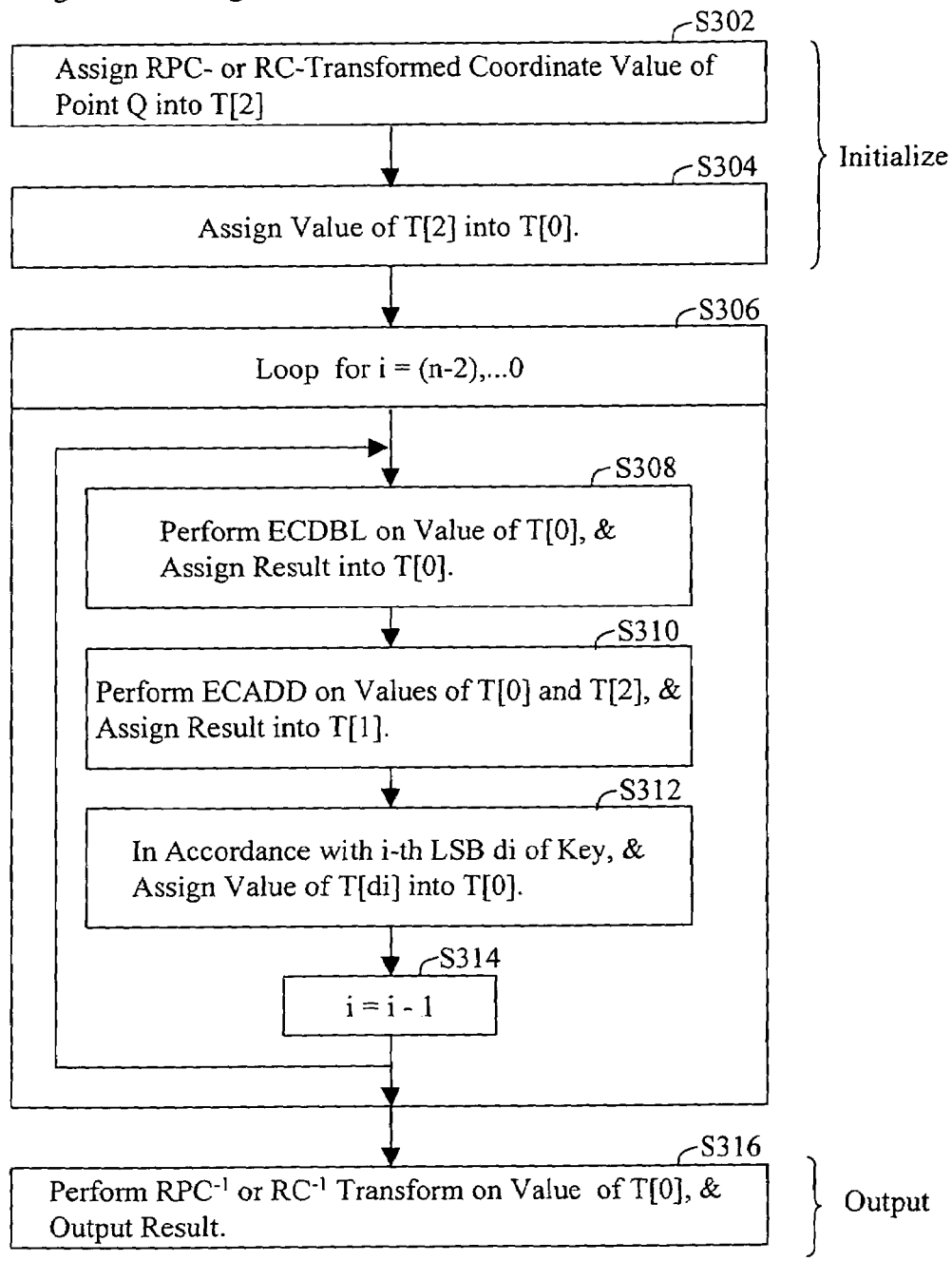
FIG. 3 shows a flow diagram of Algorithm 5 which is executed by the processor or encryption/decryption unit.
Figure 14:
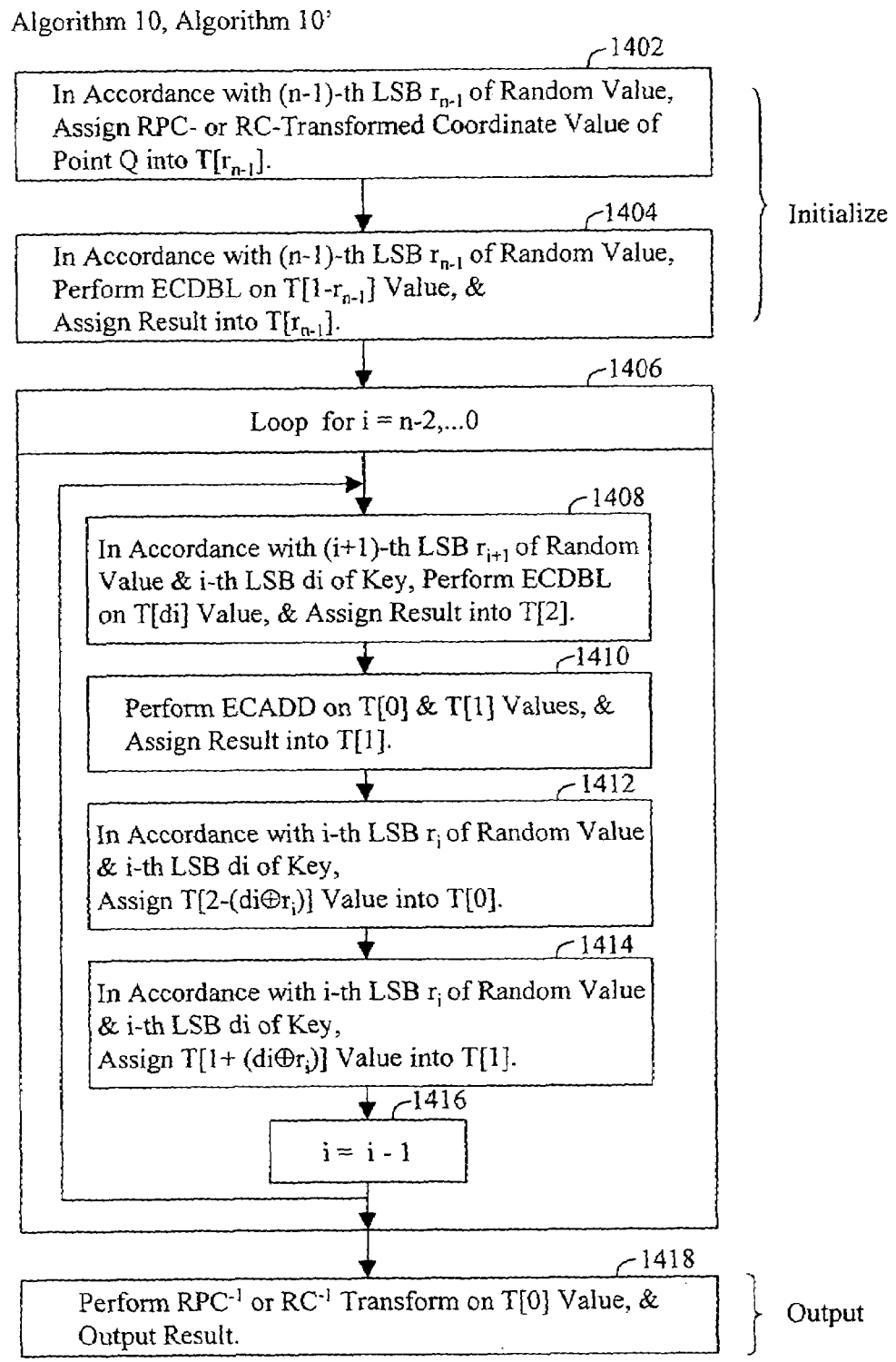
FIG. 14 shows a flow diagram of Algorithms 10 and 10' which are executed by the processor or encryption/decryption unit as shown in FIG. 1.

FIG. 14 shows a flow diagram of Algorithms 10 and 10' which are executed by the processor or encryption/decryption unit as shown in FIG. 1. The only difference between Algorithms 10 and 10' is that the former uses the RPC and the latter uses the RC.

Referring to FIG. 14, at Step 1402, the processor assigns or stores the RPC- or RC-transformed coordinate value of a point Q into the register $T[r_{n-1}]$ in accordance with the value $r_{n-1}$ of the (n−1)-th bit of the random value r. At Step 1404, the processor performs the ECDBL operation on the value of the register $T[1-r_{n-1}]$ in accordance with the value $r_{n-1}$ of the (n−1)-th bit of the random value r, and assigns the resultant doubled value into the register $T[r_{n-1}]$. Steps 1402 and 1404 are initializing steps.

Step 1406 includes Steps 1408 to 1416, and is a looping process for the variable i=n−2, . . . 0.

At Step 1408, the processor performs the ECDBL operation on the value of the register T[di] in accordance with the value $r_{i+1}$ of the (i+1)-th LSB of the random value r and with the value di of the i-th LSB of the key, and assigns the resultant product into the register T[2]. At Step 1410, the processor performs the ECADD operation on the value of the register T[0] with the value of the register T[1], and assigns the resultant sum back into the register T[1]. At Step 1412, the processor performs the ECDBL operation on the value of the register $T[2-(di \oplus r_j)]$ in accordance with the value $r_i$ of the i-th LSB of the random value r and with the value di of the i-th LSB of the key, and assigns the resultant doubled value into the register T[0]. At Step 1414, the processor assigns the value of the register $T[1+(di \oplus r_j)]$ into the register T[1] in accordance with the value $r_i$ of the i-th LSB of the random value r and with the value di of the i-th LSB of the key. At Step 1416, the processor sets i=i−1. When the looping process in Step 1406 for i=n−2, . . . 0 is completed, the procedure proceeds to Step 1418.

At Step 1418, the processor performs the inverse RPC or RC ($RPC^{-1}$ or $RC^{-1}$) transform on the value of the register T[0] and provides the inverse transformed value as an output.

Figure 15:
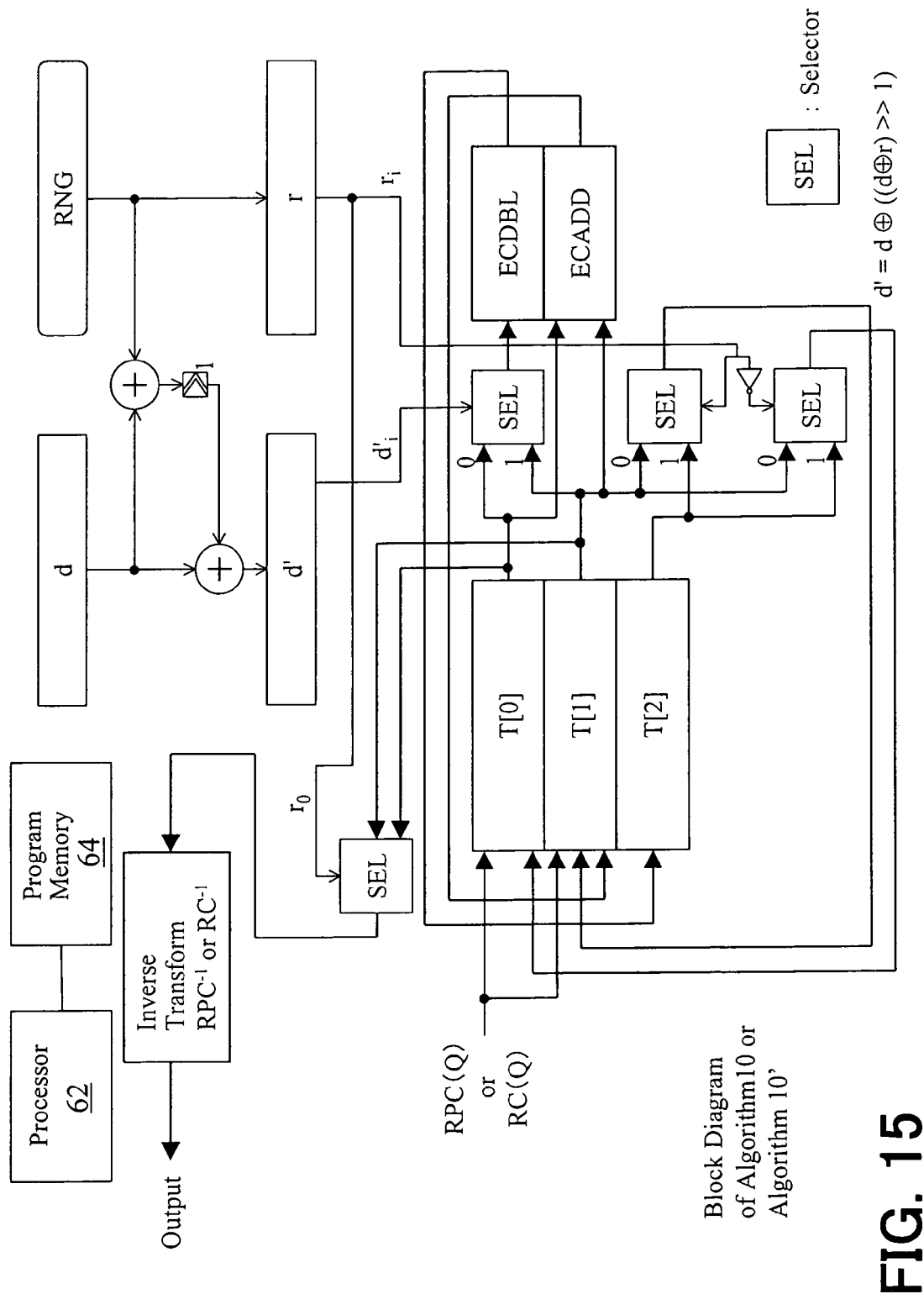
FIG. 15 shows a block diagram implementing Algorithms 10 and 10'.

FIG. 15 shows a block diagram implementing Algorithms 10 and 10'. In FIG. 15 and in FIGS. 17, 19 and 22 to be described later, "T[x]" represents a register for storing a temporary variable, and "W[x]" represents a register for storing a table variable, where "x" in brackets represents the address of the storing register, "d" and "d'" represent registers for storing secret information, "r" represents a register for storing the random value r, "R" represents a register for storing the output value, "ECDBL" operation represents a block for performing an operation of doubling a point on the elliptical curve, "ECADD" represents a block for performing an operation of addition of a point on the elliptical curve, "SEL" represents a selector for selecting one of a plurality of inputs for output, "D" represents a demultiplexer for providing one input to a selected one of a plurality of outputs, "R" represents a block for generating a random value, "$\oplus$" represents an XOR performed on a bit-by-bit basis, ">>1" represents shifting to the right by one bit, and "$\Delta$" represents an operation of NOT.

The encryption device further includes a processor 62, and a program memory 64 such as a ROM. The processor 62 controls the different elements shown in FIG. 15 in accordance with the programs stored in the memory 64. Alternatively, the processor 62 may be configured to implement the different elements by executing the programs in the memory 64 that implement the functions equivalent to the different elements.

A flow for the block diagram of FIG. 15 is shown below.

Step 01: T[0] = T[1] = RPC(Q) or RC(Q)  ⎫
Step 02: T[2] = ECDBL(T[0])              ⎬ Initialize
Step 03: T[1 − $r_{n-1}$] = T[2]         ⎭

Step 04: r = RNG( )                      ⎫
Step 05: d' = d ⊕ ((d ⊕ r) >>1)          ⎬ Randomize Secret Key
                                          ⎭

Step 06: i = n − 2

Step 07: T[2] = ECDBL(T[$d'_i$])         ⎫
Step 08: T[1] = ECADD(T[0], T[1])        ⎬ Point Doubling & Addition
                                          ⎭

Step 09: T[0] = T[2 − $r^i$]             ⎫
Step 10: T[1] = T[1 + $r_i$]             ⎬ Copy Data
                                          ⎭

Step 11: i = i − 1
Step 12: if (i >= 0) go Step 07
Step 13: R = Inverse(T[$d_0 \oplus r_0$]) }Inverse Transform & Output The differences between this flow and the flow of Algorithms 10 and 10' are like the following.

In the initializing process in Algorithms 10 and 10', the registers T[0] and T[1] into which Q and ECDBL(Q) are to be assigned are directly specified in accordance with $r_{n-1}$, but in this flow, the process is performed in three steps, that is, first Q is assigned into both of the registers T[0] and T[1], then the ECDBL operation is performed and the resultant product is stored in the register T[2], and then the register, into which the value of the register T[2] is to be copied and stored, is determined in accordance with $r_{n-1}$.

In Algorithms 10 and 10', the operations are performed on the secret key d and the random value r in the looping process, whereas in this flow, the XORing of the secret key d with the random value r is performed in the secret key randomizing process prior to the looping process and in the inverse transform after the looping process. This involves changes of the indices for the point doubling and the data copying. This flow is equivalent to the flow of Algorithms 10 and 10', and can be isomorphically mapped or transformed to the other.

In FIG. 15, the computation of the index for this flow is implemented by the selector, so that it is implemented in hardware, and the computation has the same effect as the selector.

Figure 8:
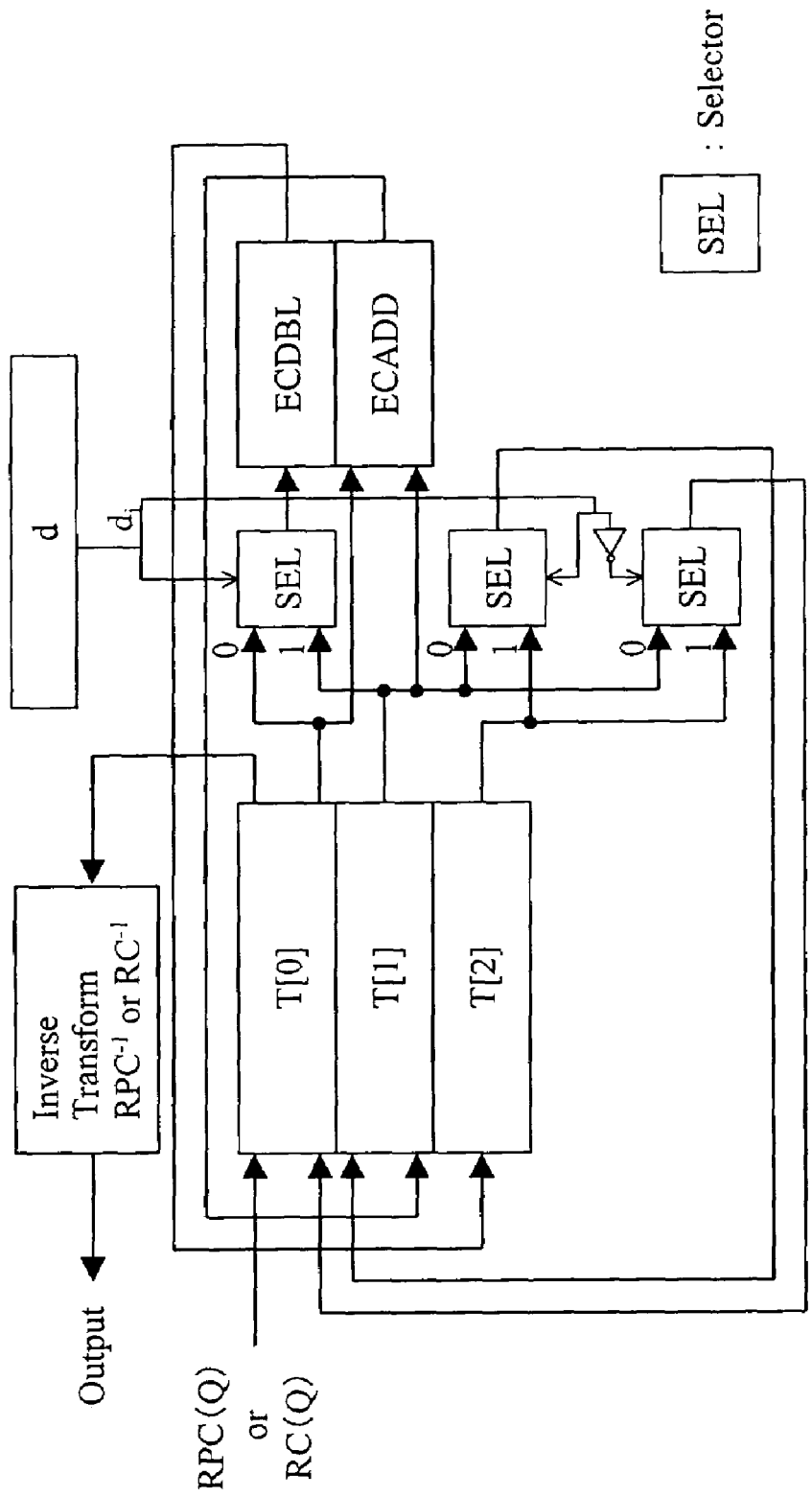
FIG. 8 shows a block diagram implementing Algorithm 7.
Figure 9:
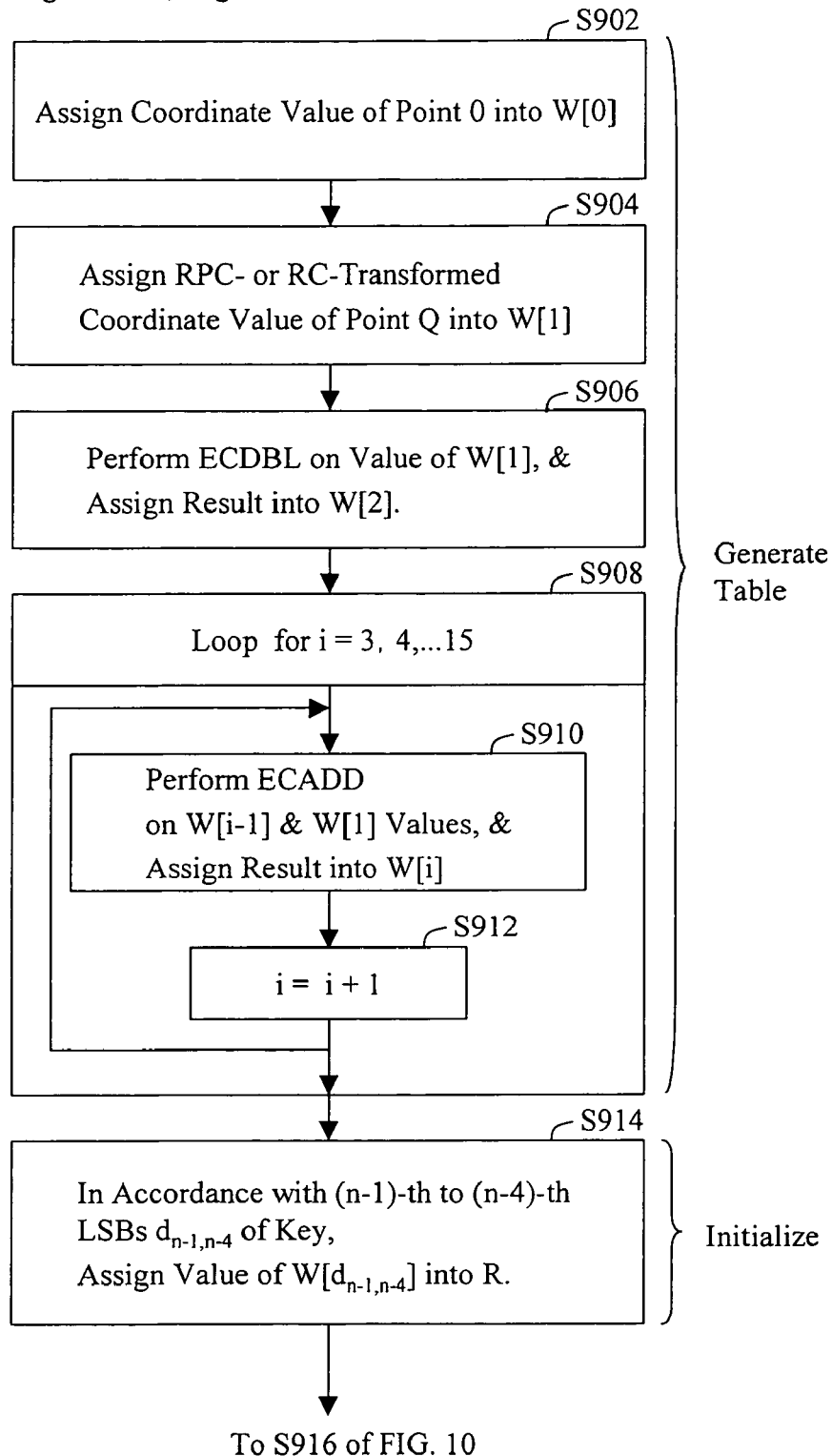
FIGS. 9 and 10 show respective flow diagrams of Algorithms 9 and 9' which are executed by the processor or encryption/decryption unit.
Figure 10:
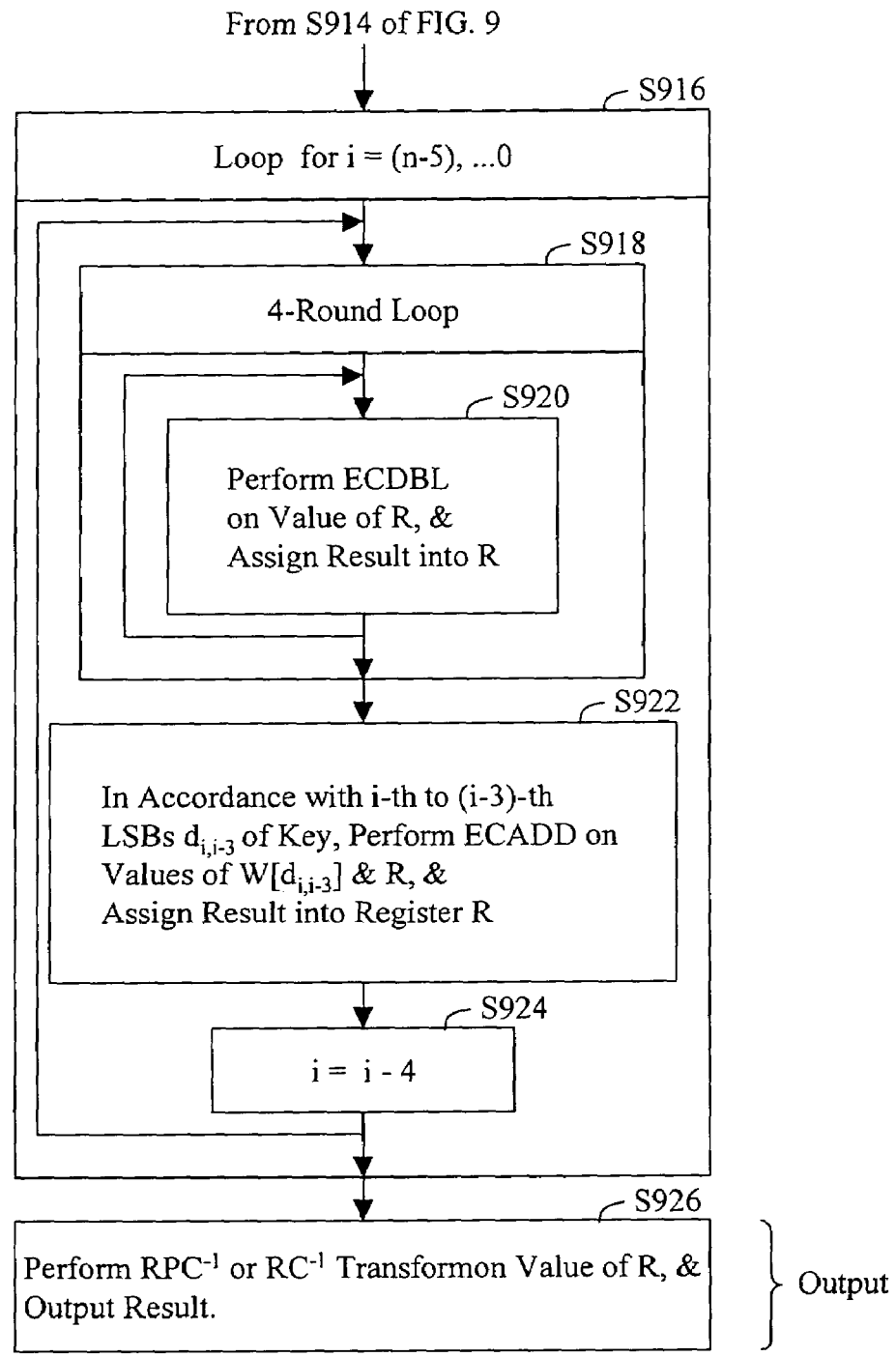

In the block diagram of Algorithms 10 and 10' of FIG. 15 in comparison with the block diagram of Algorithms 7 and 7' of FIG. 8, the number of point additions and point doublings on the elliptic curve is the same, and the only difference is the inclusion of the secret key randomizing process.

Algorithms 11 and 11' shown below are formed by applying the same address-bit DPA countermeasure to Algorithms 5 and 5', respectively.

<Algorithm 11: Binary Method (MSB, add-and-double-always, RPC, RA)>

T'[2] := RPC(Q)
T'[$r_{n-1}$] := T'[2]

-continued

```
for i = n-2 downto 0 {
    T'[r_{i+1}] := ECDBL(T'[r_{i+1}])
    T'[1-r_{i+1}] := ECADD(T'[r_{i+1}], T'[2]
    T'[r_i] := T'[di ⊕ r_{i+1}]
}
R ← T'[r_0],
``` where T"[0], T"[1] and T"[2] are temporary variables, d is an n-bit scalar value, di is the i-th LSB of the value d, r represents an n-bit random value, $r_i$ is the i-th LSB of the value r, and "←-" represents the inverse transform of the RPC representation.

<Algorithm 11': Binary Method (MSB, add-and-double-always, RC, RA)>

```
T"[2] := RC(Q)
T"[r_{n-1}] := T"[2]
for i = n-2 downto 0 {
    T"[r_{i+1}] := ECDBL(T"[r_{i+1}])
    T"[1-r_{i+1}] := ECADD(T"[r_{i+1}], T"[2])
    T"[r_i] := T"[di ⊕ r_{i+1}]
}
R ← T"[r_0],
``` where T"[0], T"[1] and T"[2] are temporary variables, d is an n-bit scalar value, di is the i-th LSB of the value d, r represents an n-bit random value, $r_i$ is the i-th LSB of the value r, and "←" represents the inverse transform of the RC representation.

Figure 16:
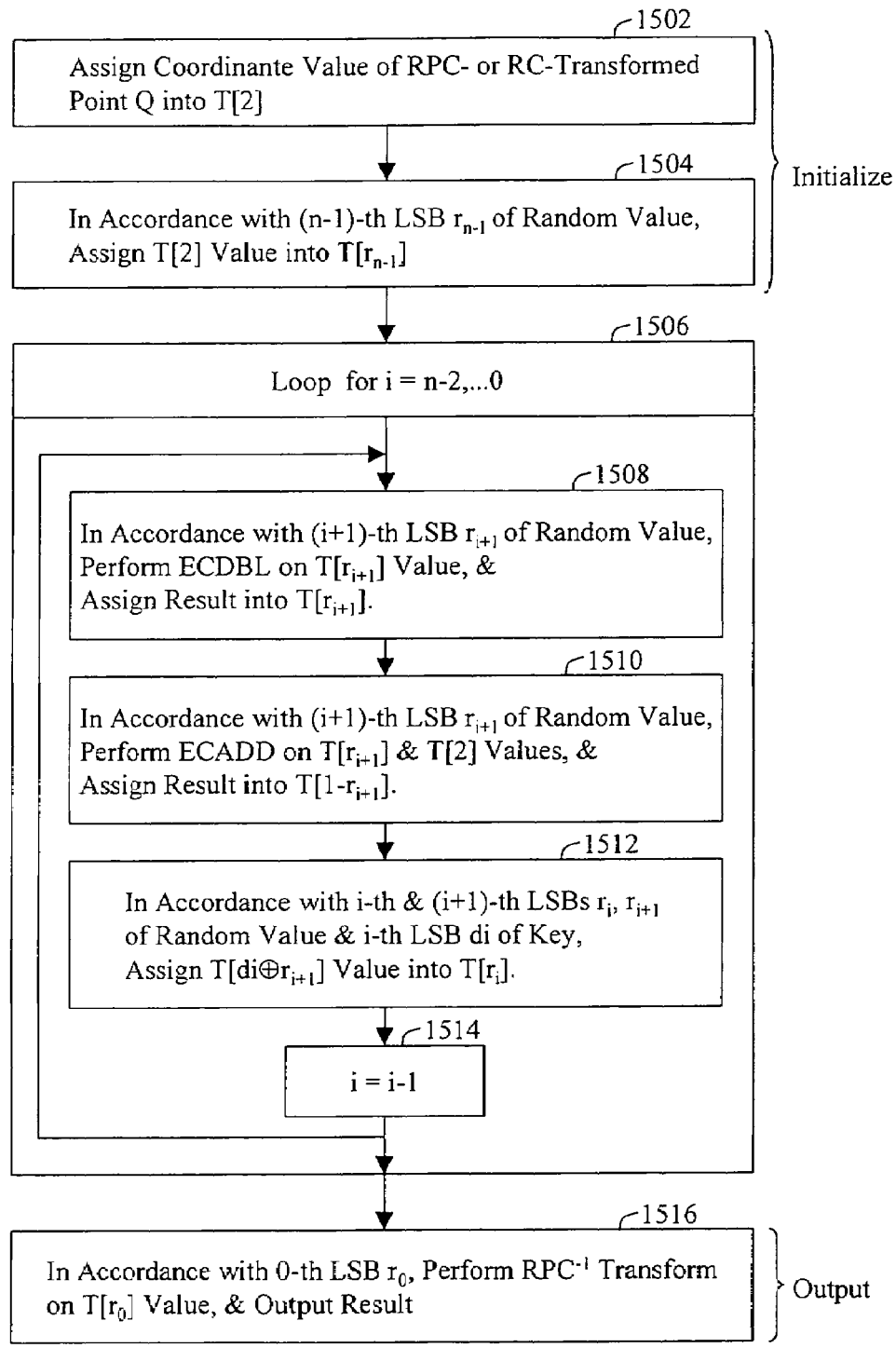
FIG. 16 shows a flow diagram of Algorithms 11 and 11' which are executed by the processor or encryption/decryption unit as shown in FIG. 1.

FIG. 16 shows a flow diagram of Algorithms 11 and 11' which are executed by the processor or encryption/decryption unit as shown in FIG. 1.

At Step 1502, the processor assigns the RPC- or RC-transformed coordinate value of a point Q into the register T[2]. At Step 1504, the processor performs the ECDBL operation on the value of the register T[2] in accordance with the value $r_{n-1}$, of the (n-1)-th bit of the random value r, and assigns the resultant doubled value into the register T[$r_{n-1}$] Steps 1502 and 1504 are initializing steps.

Step 1506 includes Steps 1508 to 1514, and is a looping process for the variable i=n-2, ... 0.

At Step 1508, the processor performs the ECDBL operation on the value of the register T[$r_{i+1}$] in accordance with the value $r_{i+1}$ of the (i+1)-th LSB of the random value r, and assigns the resultant product into the register T[$r_{i+1}$]. At Step 1510, the processor performs the ECADD operation on the values of the registers T[$r_{i+1}$] and T[2] in accordance with the value $r_{i+1}$ of the (i+1)-th LSB of the random value r, and assigns the resultant sum into the register T[1-$r_{i+1}$]. At Step 1512, the processor performs the ECDBL operation on the value of the register T[di⊕$r_{j+1}$] in accordance with the values $r_i$ and $r_{i+1}$ of the (i+1)-th and i-th LSBs of the random value r and with the value di of the i-th LSB of the key, and assigns the resultant doubled value into the register T[0]. When the loop at Step 1506 for i=n-2, ... 0 is completed, the procedure proceeds to Step 1516.

At Step 1516, the processor performs the inverse RPC or RC(RPC$^{-1}$ or RC$^{-1}$) transform on the value of the register T[$r_0$] in accordance with the value $r_0$ of the zeroth LSB of the random value r, and provides the inverse transformed value as an output.

Figure 17:
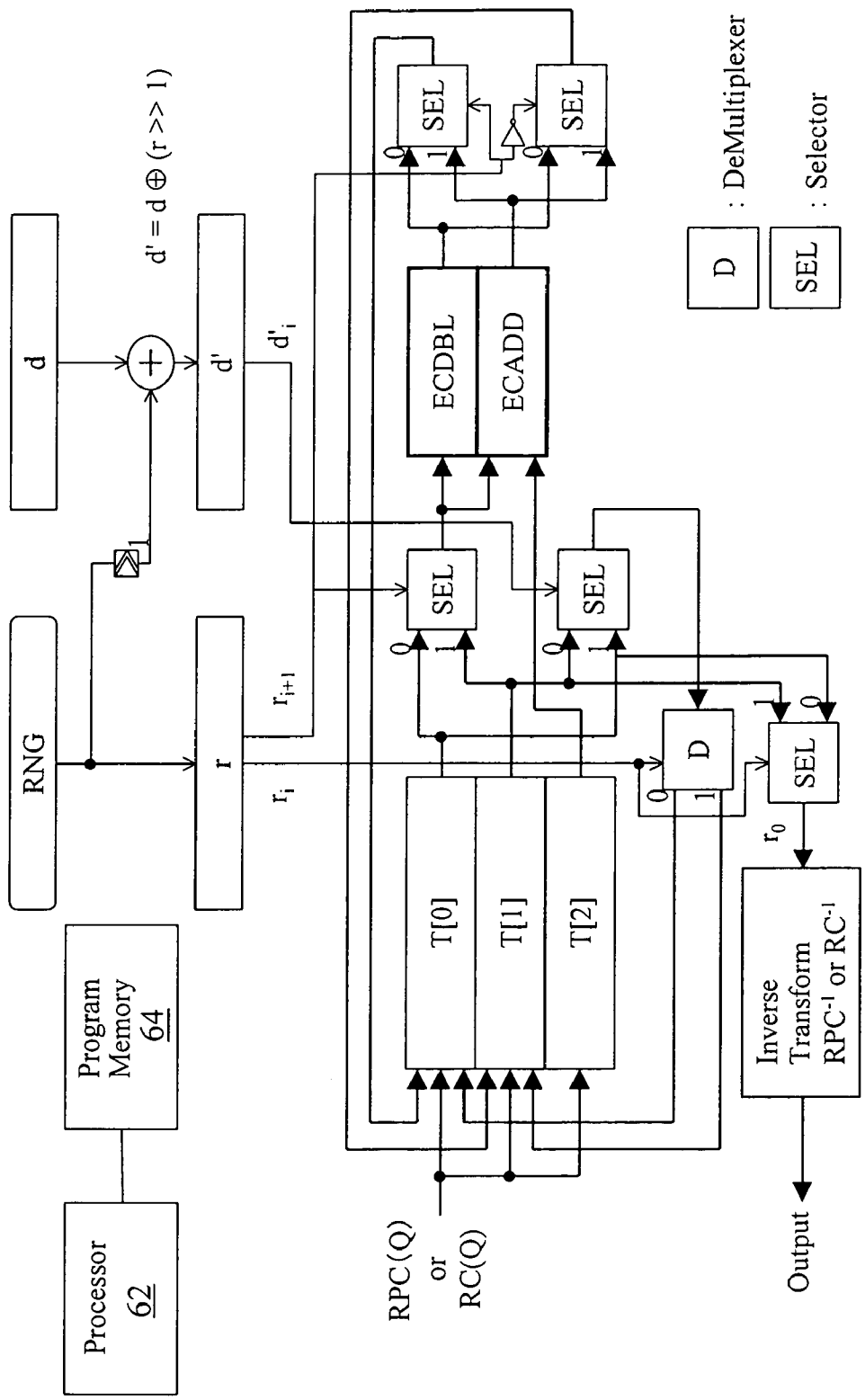
FIG. 17 shows a block diagram implementing Algorithms 11 and 11'.

FIG. 17 shows a block diagram implementing Algorithms 11 and 11'.

The encryption device further includes a processor 62, and a program memory 64 such as a ROM. The processor 62 controls the different elements shown in FIG. 17 in accordance with the programs stored in the memory 64. Alternatively, the processor 62 may be configured to implement the different elements by executing the programs in the memory 64 that implement the functions equivalent to the different elements.

A flow for the block diagram of FIG. 17 is shown below.

<Flow of Embodiment 2: Flow Embodying Algorithms 11, 11'>

```
Step 01: T[0] = T[1] = T[2] = RPC(Q) or RC(Q) } Initialize
Step 02: r = RNG()                    ⎫
Step 03: d' = d ⊕ (r>>1)              ⎬ Randomize Secret Key
                                       ⎭
Step 04: i = n - 2
Step 05: T[r_{i+1}] = ECDBL(T[r_{i+1}])   ⎫ Point
Step 06: T[1-r_{i+1}] = ECADD(T[r_{i+1}], ⎬ Doubling &
         T[2])                             ⎭ Addition
Step 07: T[r_i] = T[d']               }Copy Data
Step 08: i = i - 1
Step 09: if (i >= 0) go Step 05
Step 10: R = Inverse(T[d_0 ⊕ r_0]) }Inverse Transform & Output
```

This flow can be applied to both of Algorithms 11 and 11'. The differences between this flow and the flow of Algorithms 11 and 11' are like the following.

In the initializing process in Algorithms 11 and 11', either of the registers T[0] and T[1] whichever is specified in accordance with $r_{n-1}$ is initialized to Q, but in this flow, both of the registers T[0] and T[1] are initialized to Q.

In Algorithms 11 and 11', the operations are performed on the secret key d and the random value r in the copying process, whereas in this flow, the XORing of the secret key d with the random value r is performed in the secret key randomizing process prior to the looping process and in the inverse transform process after the looping process. This involves change of the index for the data copying. This flow is equivalent to the flow of Algorithms 11 and 11', and can be isomorphically mapped or transformed to the other flow.

In FIG. 17, the computation of the index in the flow is implemented by the selector and demultiplexer, so that it is implemented in hardware, and the computation has the same effect as the selector and demultiplexer.

Figure 4:
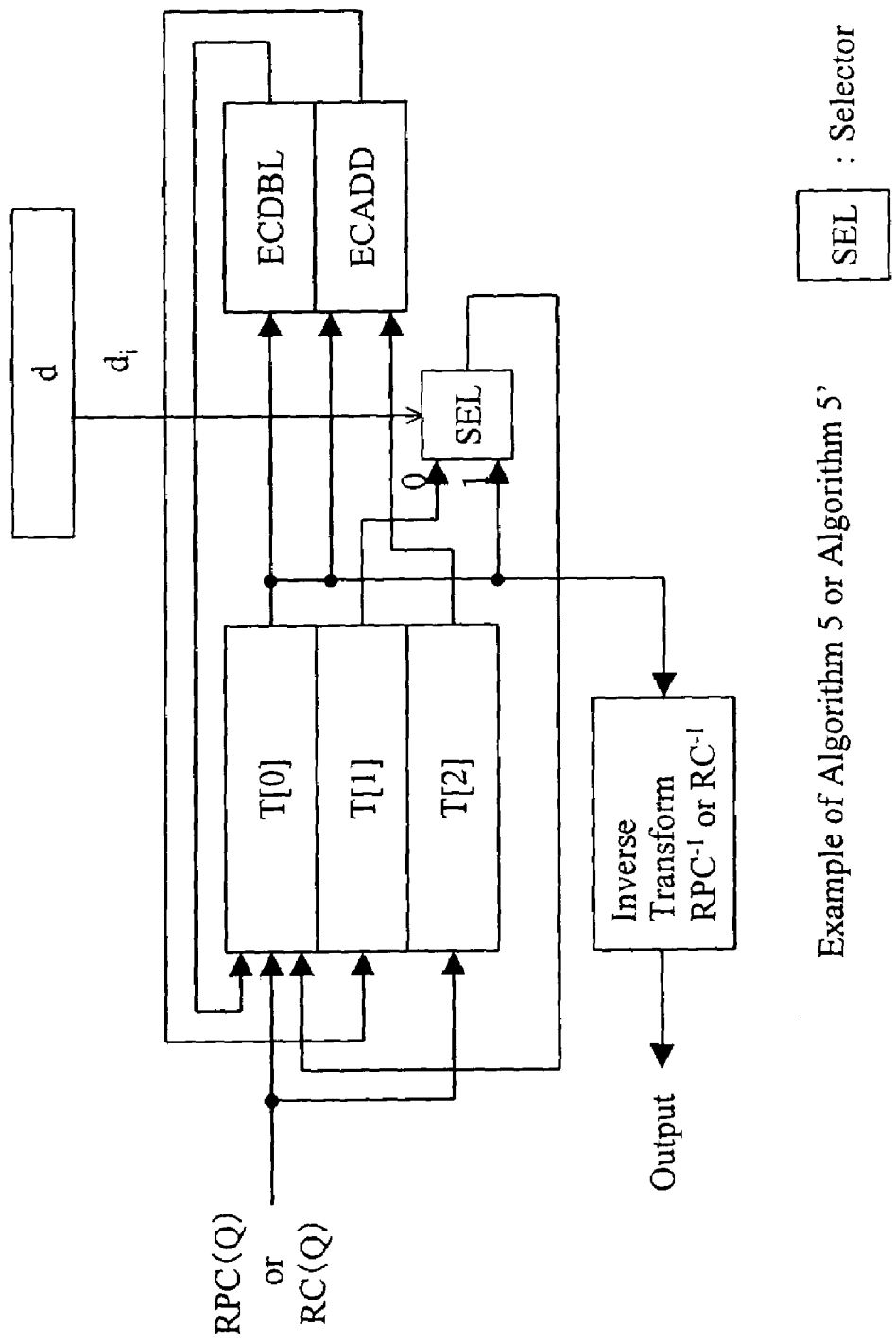
FIG. 4 shows a block diagram implementing Algorithm 5.
Figure 5:
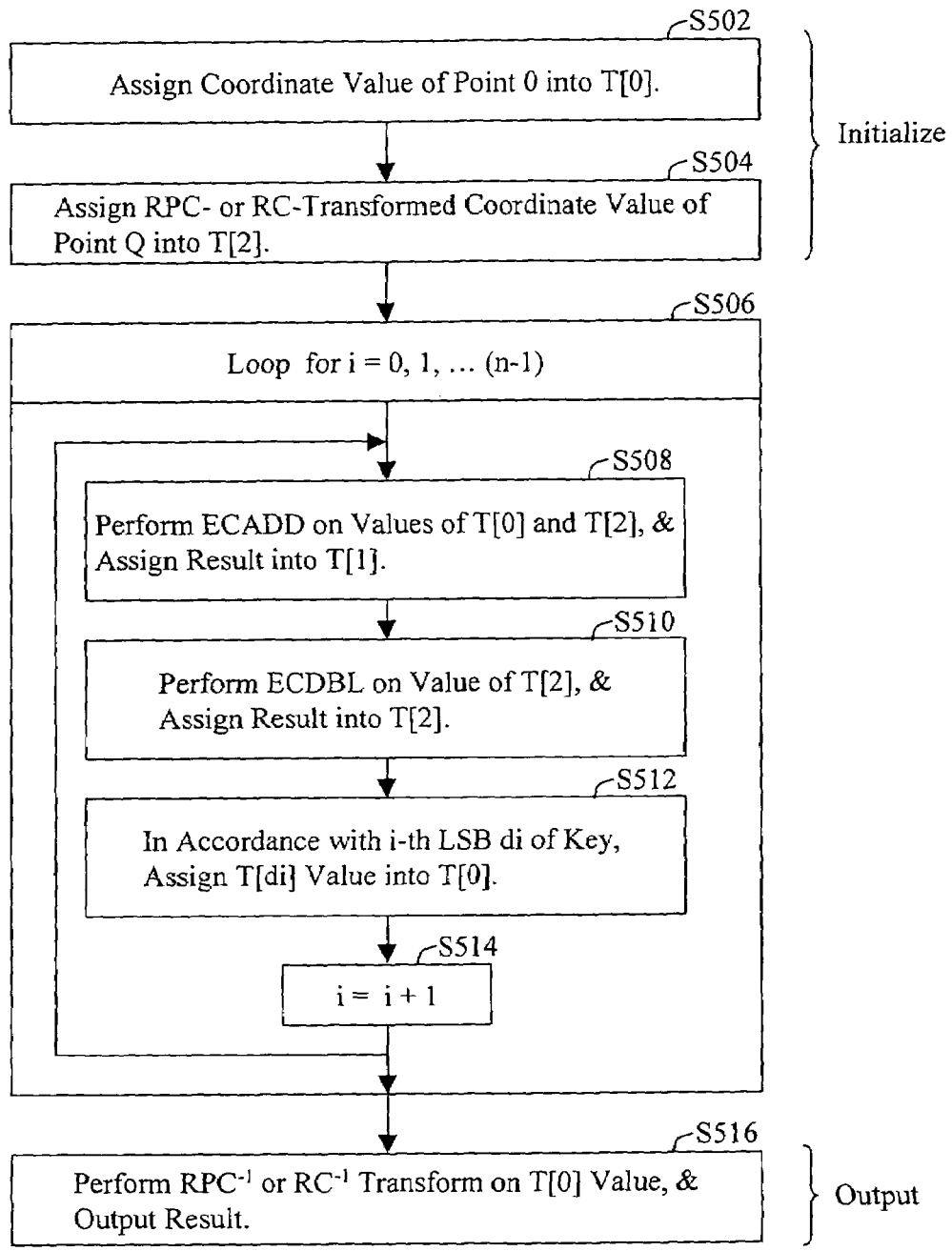
FIG. 5 shows a flow diagram of Algorithm 6 which is executed by the processor or encryption/decryption unit.

In the block diagram of Algorithms 11 and 11' of FIG. 17 in comparison with the block diagram of Algorithms 5 and 5' of FIG. 4, the number of point additions and point doublings on the elliptic curve is the same, and the only difference is the inclusion of the secret key randomizing process and the inclusion of the selector and demultiplexer which specifies the data output channel.

Algorithms 12 and 12' shown below are formed by applying the same address-bit DPA countermeasure to Algorithms 6 and 6', respectively.

<Algorithm 12: Binary Method (LSB, add-and-double-always, RPC, RA)>

```
T'[r_0] := O
T'[2] := RPC(Q)
for i = 0 upto n-1 {
    T'[1-r_i] := ECADD(T'[r_i], T'[2])
    T'[2] := ECDBL(T'[2])
    T'[r_{i+1}] := T'[di ⊕ r_i]
}
R ← T'[r_n],
``` where T"[0], T"[1] and T"[2] are temporary variables, d is an n-bit scalar value, di is the i-th LSB of the value d, r represents a (n+1)-bit random value, $r_i$ is the i-th LSB of the value r, and "←" represents the inverse transform of the RPC representation.

<Algorithm 12': Binary Method (LSB, add-and-double-always, RC, RA)>

```
T"[r_0] := O
T"[2] := RPC(Q)
for i = 0 upto n-1 {
    T"[1-r_i] := ECADD(T"[r_i], T"[2])
    T"[2] := ECDBL(T"[2])
    T"[r_{i+1}] := T"[di ⊕ r_i]
}
R ← T"[r_n],
``` where T"[0], T"[1] and T"[2] are temporary variables, d is an n-bit scalar value, di is the i-th LSB of the value d, r represents an (n+1)-bit random value, $r_i$ is the i-th LSB of the value r, and "←" represents the inverse transform of the RC representation.

Figure 18:
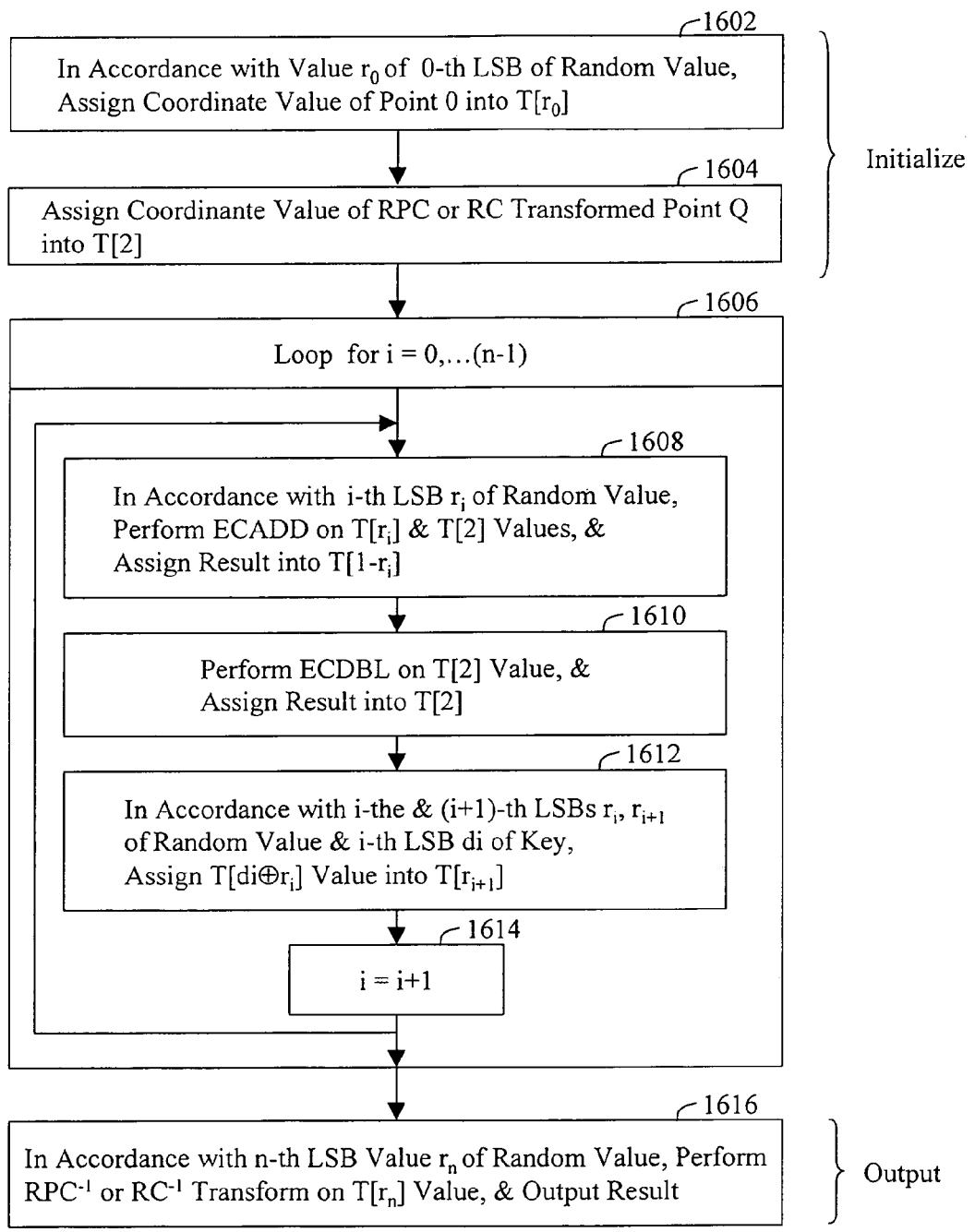
FIG. 18 shows a flow diagram of Algorithms 12 and 12' which are executed by the processor or encryption/decryption unit as shown in FIG. 1.

FIG. 18 shows a flow diagram of Algorithms 12 and 12' which are executed by the processor or encryption/decryption unit as shown in FIG. 1.

At Step 1602, the processor assigns the coordinate value of a point 0 or zero into the register T[$r_0$] in accordance with the value $r_0$ of the zeroth LSB of the random value r. At Step 1604, the processor assigns the RPC- or RC-transformed coordinate value of a point Q into the register T[2]. Steps 1602 and 1604 are initializing steps.

Step 1606 includes Steps 1608 to 1616, and is a looping process for the variable i=0, n−1.

At Step 1608, the processor performs the ECADD operation on the values of the registers T[$r_i$] and T[2] in accordance with the value $r_i$ of the i-th LSB of the random value r, and assigns the resultant sum into the register T[1−$r_i$]. At Step 1610, the processor performs the ECDBL operation on the value of the register T[2], and assigns the resultant product into the register T[2]. At Step 1612, the processor assigns the value of the register T[di⊕$r_{j+1}$] into the register T[$r_{j+1}$] in accordance with the values $r_i$ and $r_{i+1}$ of the i-th and (i+1)-th LSBs of the random value r and with the value di of the i-th LSB of the key. At Step 1614, the processor sets i=i+1. When the loop at Step 1606 for i=0, . . . n−1 is completed, the procedure proceeds to Step 1616.

At Step 1616, the processor performs the inverse RPC or RC(RPC$^{-1}$ or RC$^{-1}$) transform on the value of the register T[$r_n$] in accordance with the value $r_n$ of the n-th LSB of the random value r, and provides the inverse transformed value as an output.

Figure 19:
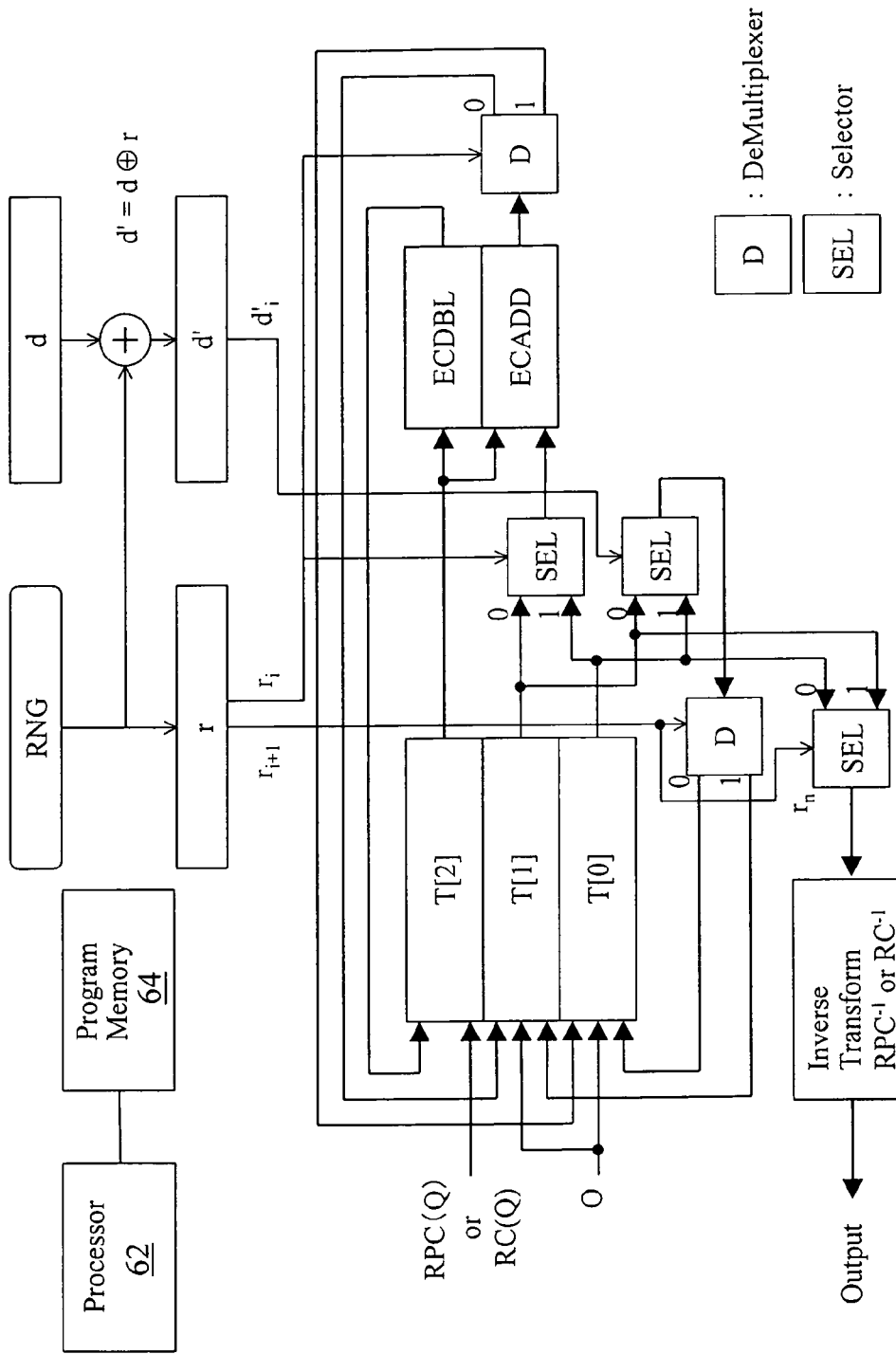
FIG. 19 shows a block diagram implementing Algorithms 12 and 12'.

FIG. 19 shows a block diagram implementing Algorithms 12 and 12'.

The encryption device further includes a processor 62, and a program memory 64 such as a ROM. The processor 62 controls the different elements shown in FIG. 19 in accordance with the programs stored in the memory 64. Alternatively, the processor 62 may be configured to implement the different elements by executing the programs in the memory 64 that implement the functions equivalent to the different elements.

A flow for the block diagram of FIG. 19 is shown below.

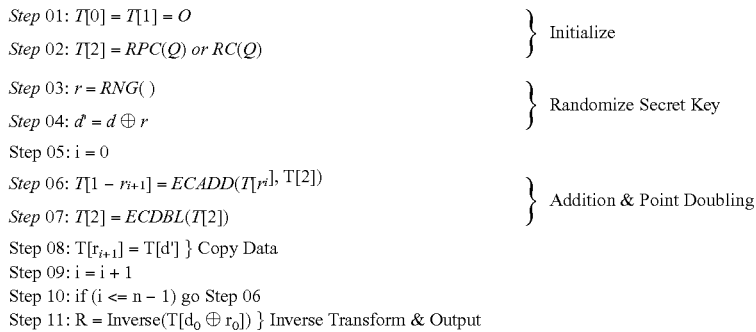

```
Step 01: T[0] = T[1] = O                            } Initialize
Step 02: T[2] = RPC(Q) or RC(Q)
Step 03: r = RNG( )                                 } Randomize Secret Key
Step 04: d' = d ⊕ r
Step 05: i = 0
Step 06: T[1 − r_{i+1}] = ECADD(T[r_i], T[2])       } Addition & Point Doubling
Step 07: T[2] = ECDBL(T[2])
Step 08: T[r_{i+1}] = T[d'] } Copy Data
Step 09: i = i + 1
Step 10: if (i <= n − 1) go Step 06
Step 11: R = Inverse(T[d_0 ⊕ r_0]) } Inverse Transform & Output
```

This flow can be applied to both of Algorithms 12 and 12'. The differences between this flow and the flow of Algorithms 12 and 12' are like the following.

In the initializing process in Algorithms 12 and 12', either of the registers T[0] and T[1] whichever is specified in accordance with $r_{n-1}$ is initialized to 0, but in this flow, both of the registers T[0] and T[1] are initialized to 0.

In Algorithms 12 and 12', the operations are performed on the secret key d and the random value r in the copying process, whereas in this flow, the XORing of the secret key d with the random value r is performed in the secret key randomizing process prior to the looping process and in the inverse transform process following the looping process. This involves change of the index for the data copying. This flow is equivalent to the flow of Algorithms 12 and 12', and can be isomorphically mapped or transformed to the other.

In FIG. 19, the computation of the index in the flow is implemented by the selector and demultiplexer, so that it is implemented in hardware, and the computation has the same effect as the selector and demultiplexer.

Figure 6:
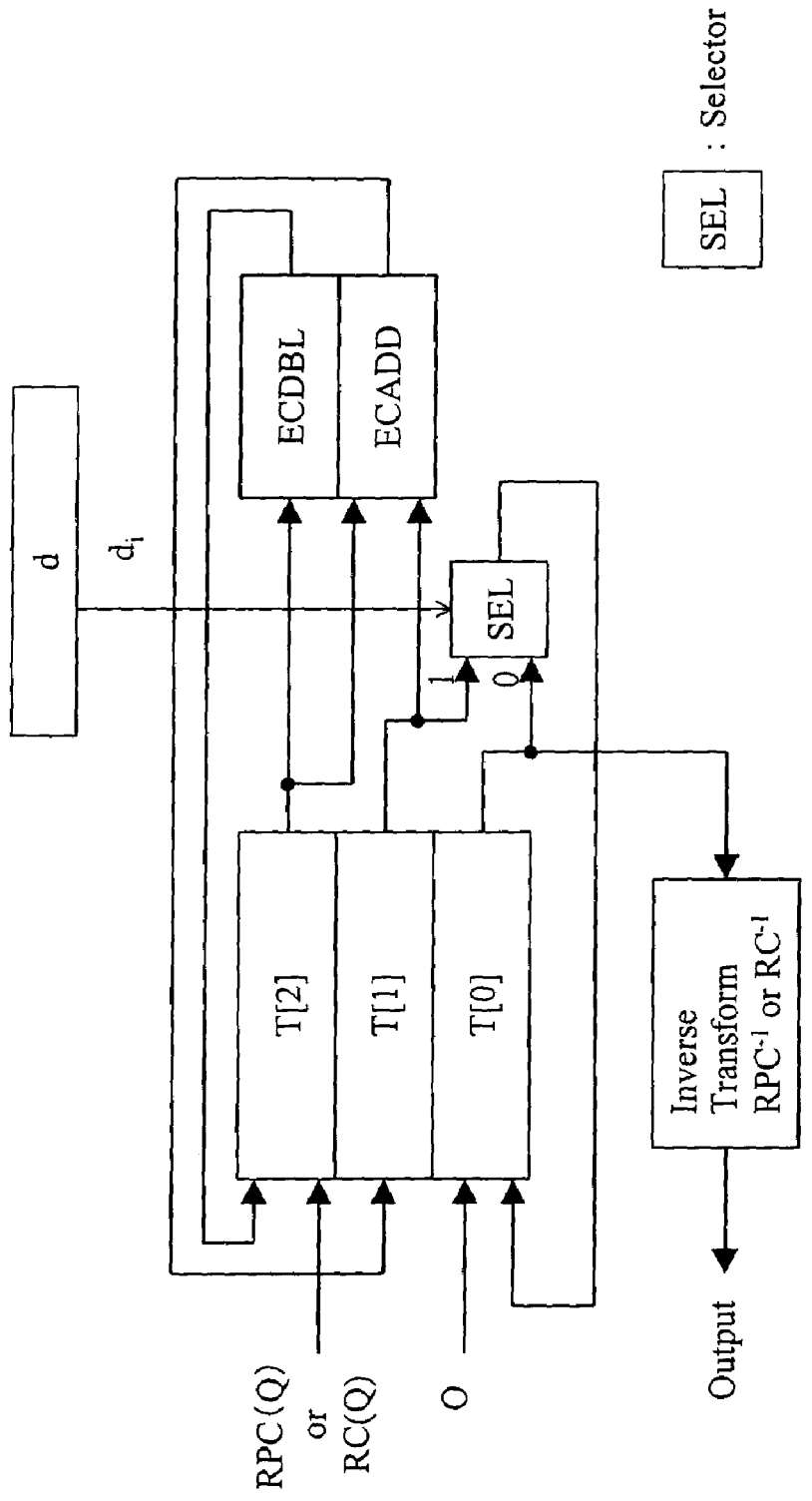
FIG. 6 shows a block diagram implementing Algorithm 6.
Figure 7:
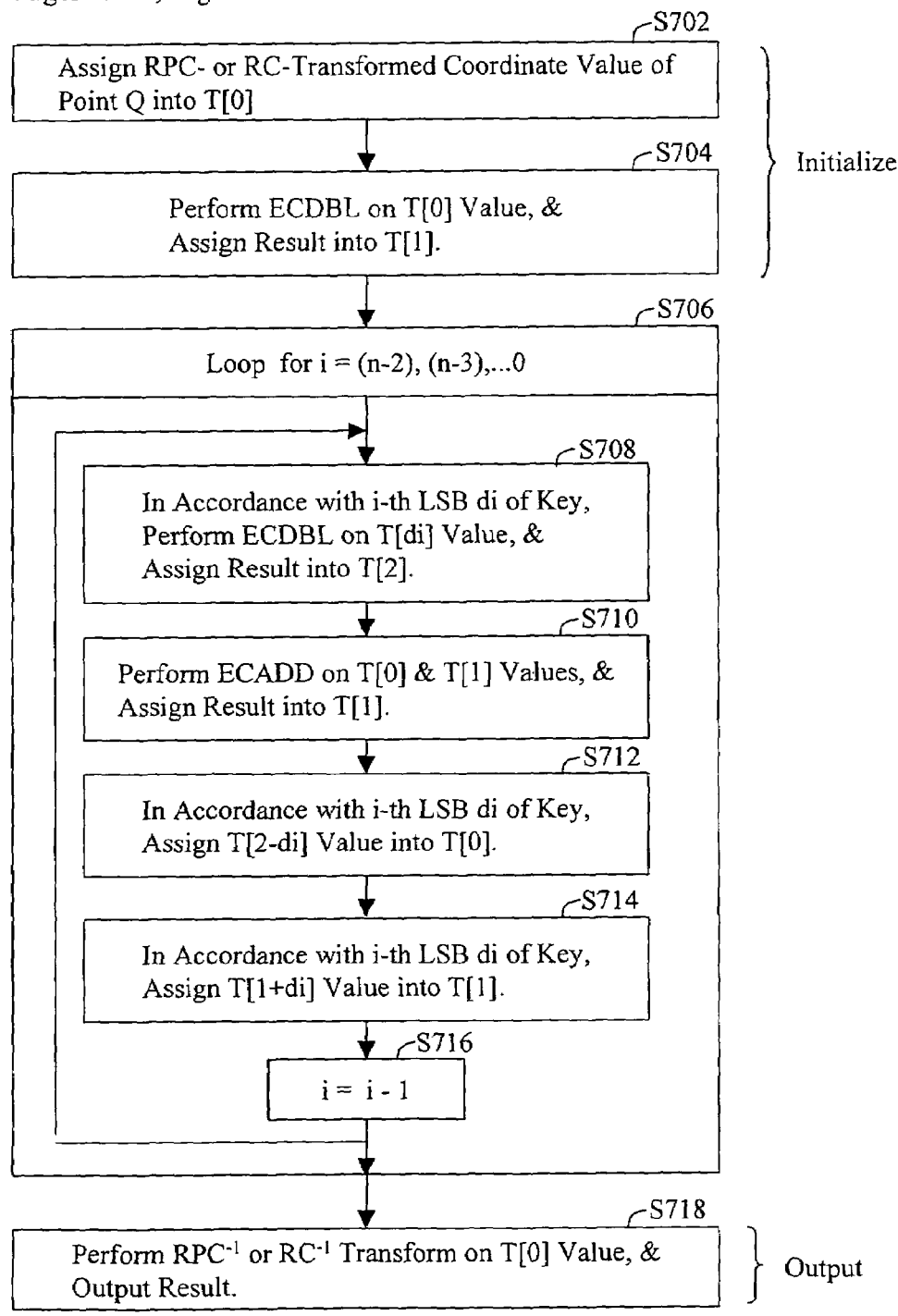
FIG. 7 shows a flow diagram of Algorithm 7 which is executed by the processor or encryption/decryption unit.

In the block diagram of Algorithms 12 and 12' of FIG. 19 in comparison with the block diagram of Algorithms 6 and 6' of FIG. 6, the number of point additions and point doublings on the elliptic curve is the same, and the only difference is the inclusion of the secret key randomizing process and the inclusion of the selector and demultiplexer which specifies the data output channel.

Algorithms 13 and 13' shown below are formed by applying the same address-bit DPA countermeasure to Algorithms 9 and 9', respectively.

<Algorithm 13: Window Method (4-Bit, RPC, RA)>

```
W' [r] = O
W' [1 ⊕ r] = RPC(Q)
W' [2 ⊕ r] = ECDBL(W' [1 ⊕ r])
for i = 3 upto 15 {
    W' [i ⊕ r] = ECADD(W' [(i−1) ⊕ r], W' [1 ⊕ r])
}
R' := W' [d_{n−1,n−4} ⊕ r]
for i = n−5 downto 0 step −4 {
    R' := ECDBL(R')
    R' := ECDBL(R')
    R' := ECDBL(R')
    R' := ECDBL(R')
    R' := ECADD(R' , W' [d_{i,i−3} ⊕ r]) . . .*
}
R ← R',
``` where d is an n-bit scalar value, it is assumed that n is a multiple of a value of 4 for simplicity, and $d_{i,i-3}$ is a 4-bit value of the i-th to (i−3)-th bits of the value d, and where R', Q', T'[0] and T'[1] are temporary variables, W'[i] represents a table for the window method, r represents a 4-bit random value, and "←" represents the inverse transform of the RPC representation.

<Algorithm 13': Window Method (4-Bit, RC, RA)>

```
W" [r] = O
W" [1⊕r] = RC(Q)
W" [2⊕r] = ECDBL(W" [1 ⊕ r])
for i = 3 upto 15 {
    W" [i⊕r] = ECADD(W" [(i−1) ⊕ r], W" [1 ⊕ r])
}
R" := W" [d_{n−1,n−4} ⊕ r]
for i = n−5 downto 0 step −4 {
    R" := ECDBL(R")
    R" := ECDBL(R")
    R" := ECDBL(R")
    R" := ECDBL(R")
    R" := ECADD(R" , W" [d_{i,i−3} ⊕ r]) . . .*
}
R ← R',
``` where d is an n-bit scalar value, it is assumed that n is a multiple of a value of 4 for simplicity, and $d_{i,i-3}$ is a 4-bit value of the i-th to (i−3)-th bits of the value d, and where R", Q", T" and T"[1] are temporary variables, W'[i] represents a table for the window method, r represents a 4-bit random value, and "←" represents the inverse transform of the RC representation.

Figure 20:
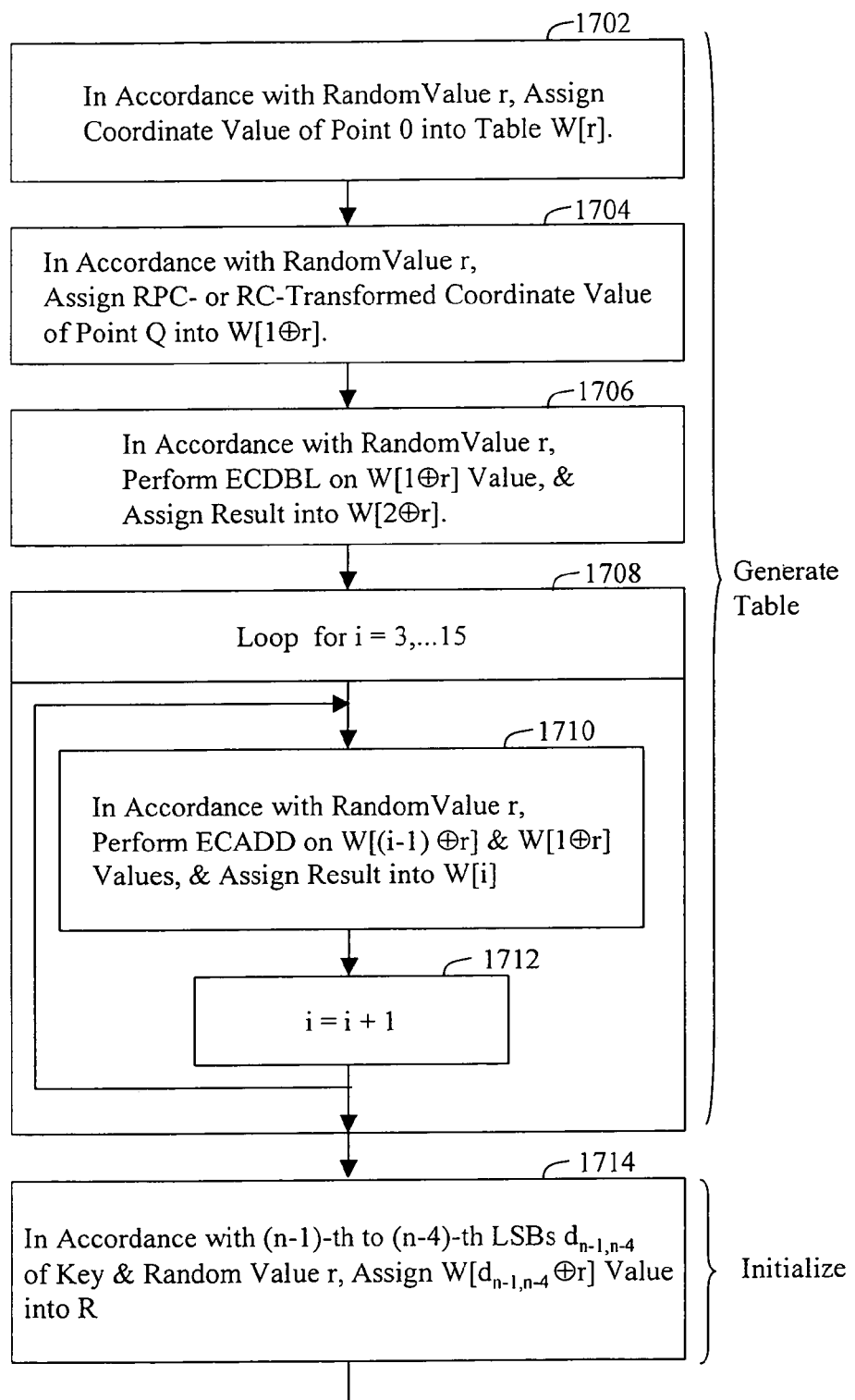
FIGS. 20 and 21 show a flow diagram of Algorithms 13 and 13' which are executed by the processor or encryption/decryption unit as shown in FIG. 1.
Figure 21:
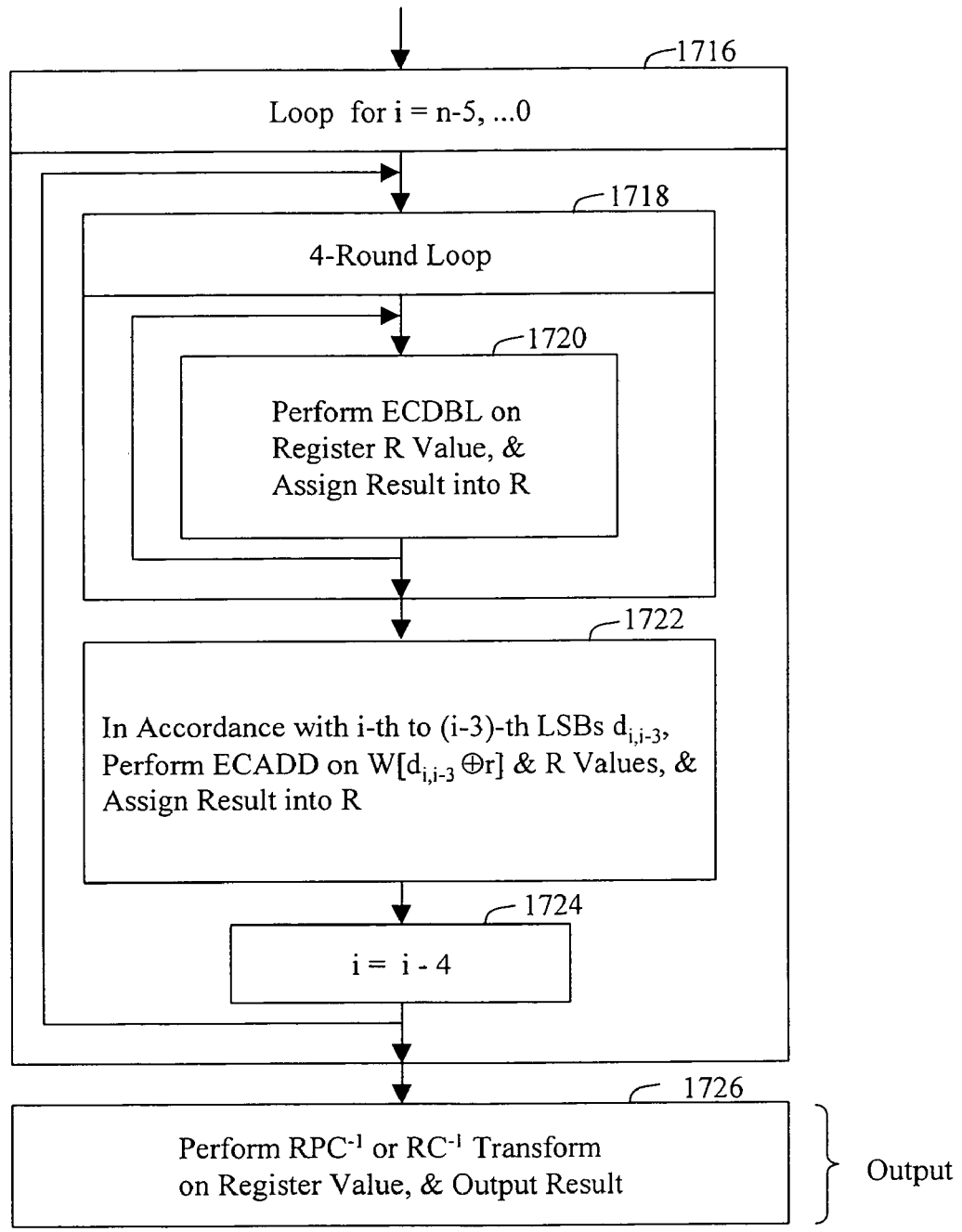

FIGS. 20 and 21 show a flow diagram of Algorithms 13 and 13' which are executed by the processor or encryption/decryption unit as shown in FIG. 1.

At Step 1702, the processor assigns the coordinate value of a point 0 or zero into the table W[r] in accordance with the random value. At Step 1704, the processor assigns the RPC- or RC-transformed coordinate value of a point Q into W[1⊕r] in accordance with the random value r. At Step 1706, the ECDBL operation is performed on the value of W[1⊕r] and the resultant product is assigned into W[2⊕r].

Step 1708 includes Steps 1710 to 1712, and is a looping process for the variable i=3, . . . 15.

At Step 1710, the processor performs the ECADD operation on the values of W[(i−1)⊕r] and W[i⊕r], and assigns the resultant sum into W[i]. At Step 1712, the processor sets i=i+1. Steps 1702 to 1712 are provided for generating a table. When the loop at Step 1708 for i=3, . . . 15 is completed, the procedure proceeds to Step 1714.

At Step 1714, the processor assigns the value of W [$d_{n-1, n-4}$⊕r] into R in accordance with the random value r and with the values of $d_{n-1, n-4}$ of the (n−1)-th, . . . (n−4)-th bits of the key. Step 1714 is an initializing step.

Step 1716 includes Steps 1718 to 1724, and is a looping process for the variable i=n−5, . . . 0.

Step 1718 is a loop which is repeated to execute the process at four times or for four rounds. At Step 1720, the processor performs the ECDBL operation on the value of the register R and assigns the resultant product into R. At Step 1722, the processor performs the ECADD operation on the value of W[$d_{i,i-3}$⊕r] and the value of R in accordance with the random value r and with the values of the i-th, . . . (i−3)-th bits of the key, and assigns the resultant sum into R. At Step 1724, the processor sets i=i−4. When the processing of Step 1716 for i=n−5, . . . 0 is completed, the procedure proceeds to Step 1726.

At Step 1726, the processor performs the inverse RPC or RC transform on the value of the register R, and provides the inverse transformed value as an output.

Figure 22:
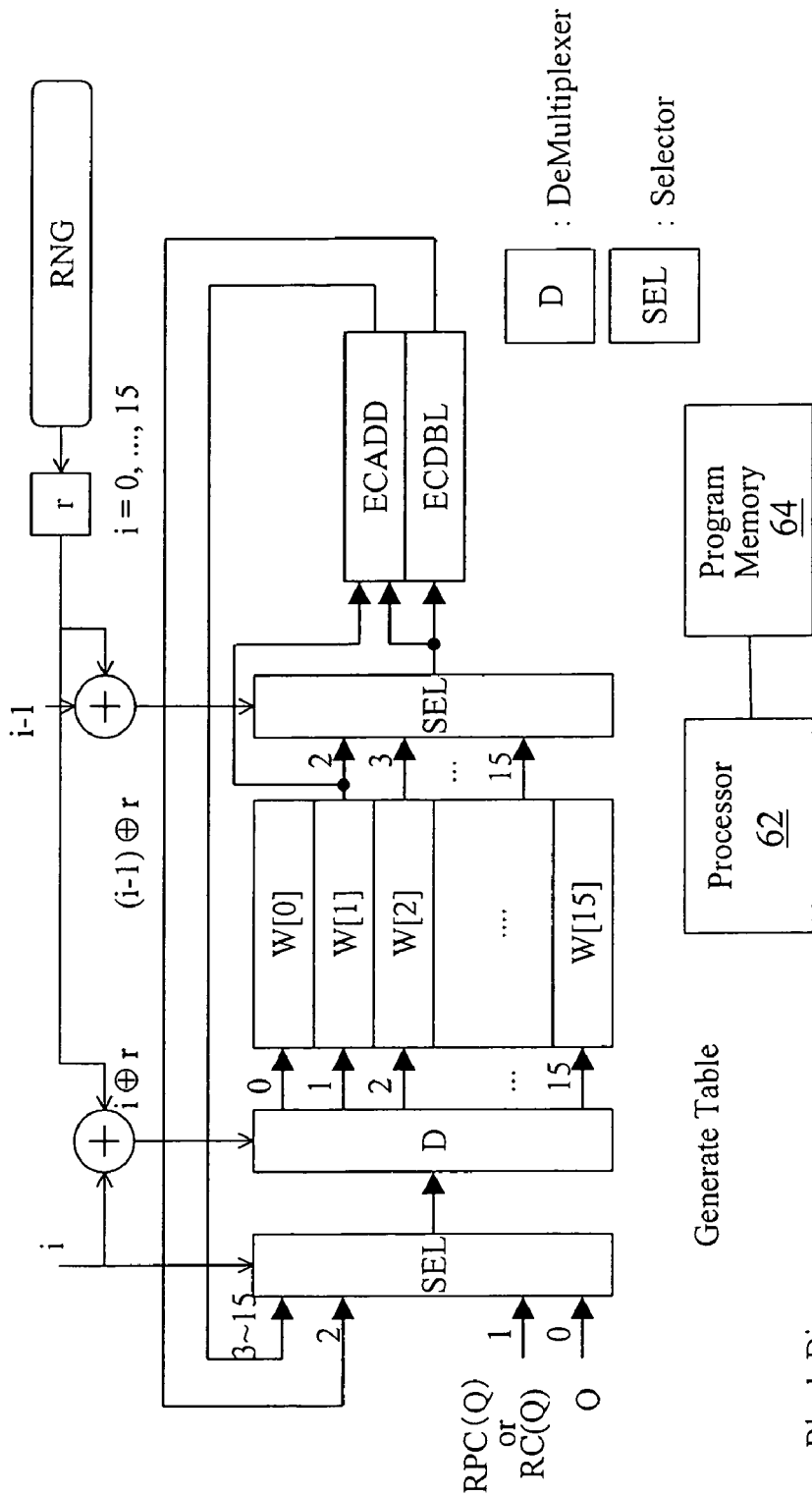
FIGS. 22 and 23 show block diagrams implementing Algorithms 13 and 13'.
Figure 23:
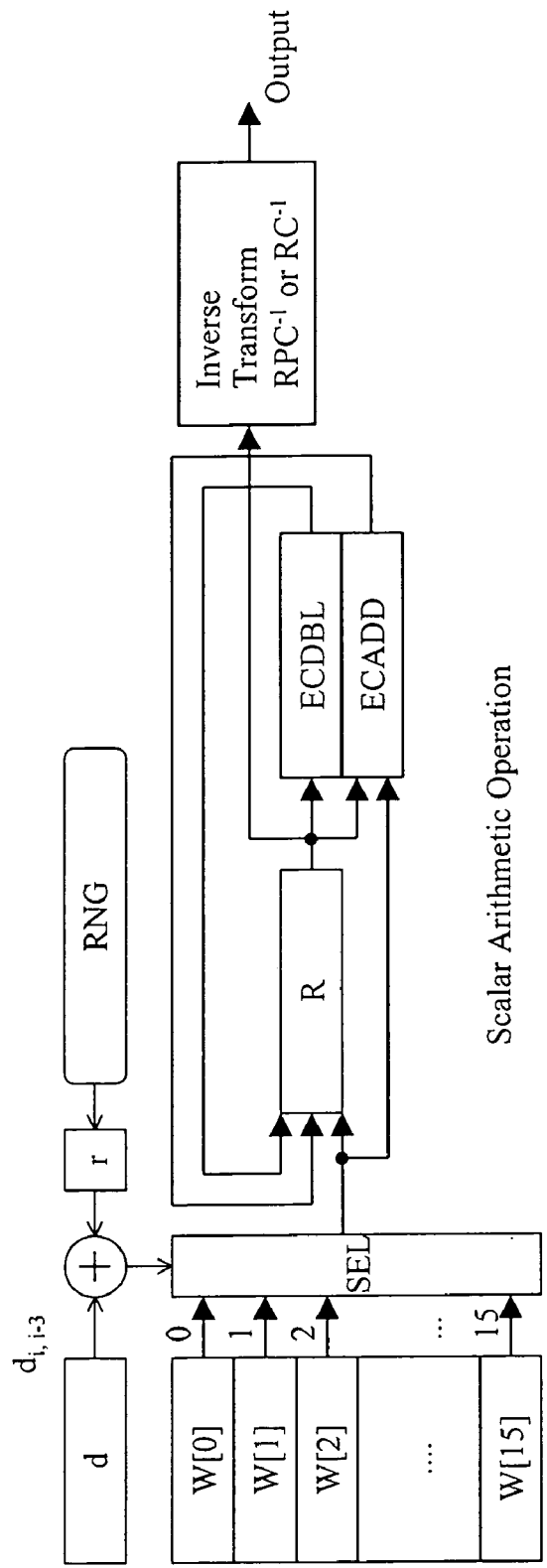

FIGS. 22 and 23 show a set of block diagrams implementing Algorithms 13 and 13'.

The encryption device further includes a processor 62, and a program memory 64 such as a ROM. The processor 62 controls the different elements shown in FIGS. 22 and 23 in accordance with the programs stored in the memory 64. Alternatively, the processor 62 may be configured to implement the different elements by executing the programs in the memory 64 that implement the functions equivalent to the different elements.

A flow for the block diagrams of FIGS. 22 and 23 is shown below.

---

Step 01: r = RNG( ) } Generate Random Value
Step 02: W[0 ⊕ r] = O
Step 03: W[1 ⊕ r] = RPC(Q) or RC(Q)        ⎫
Step 04: W[2 ⊕ r] = ECDBL (W[1 ⊕ r])        ⎪
Step 05: i = 3                               ⎬ Generate Table
Step 06: W[i ⊕ r] = ECADD (W[i −1) ⊕ r], W[1 ⊕ r])   ⎪
Step 07: i = i+1                             ⎭
Step 08: if (i >= 15) go Step 06
Step 09: R = W[$d_{n-1,n-4}$ ⊕ r] } Initialize
Step 10: i = n−5

-continued

```
Step 11: R = ECDBL (R)       ⎫
Step 12: R = ECDBL (R)       ⎪
Step 13: R = ECDBL (R)       ⎬ Point Doubling & Addition
Step 14: R = ECDBL (R)       ⎪
Step 15: R = ECADD (R, W[d_{i,i-3} ⊕ r])  ⎭
Step 16: i = i - 4
Step 17: if (i >= 0) go Step 11
Step 18: R = Inverse(R) } Inverse Transform & Output
```

The above flow can be applied to both of Algorithms 13 and 13'. The difference between this flow and the flow of Algorithms 13 and 13' is like the following.

In FIGS. 20 and 21, the computation of the index in the flow is implemented by the selector and demultiplexer, so that it is implemented in hardware, and the computation has the same effect as the selector and demultiplexer.

Figure 11:
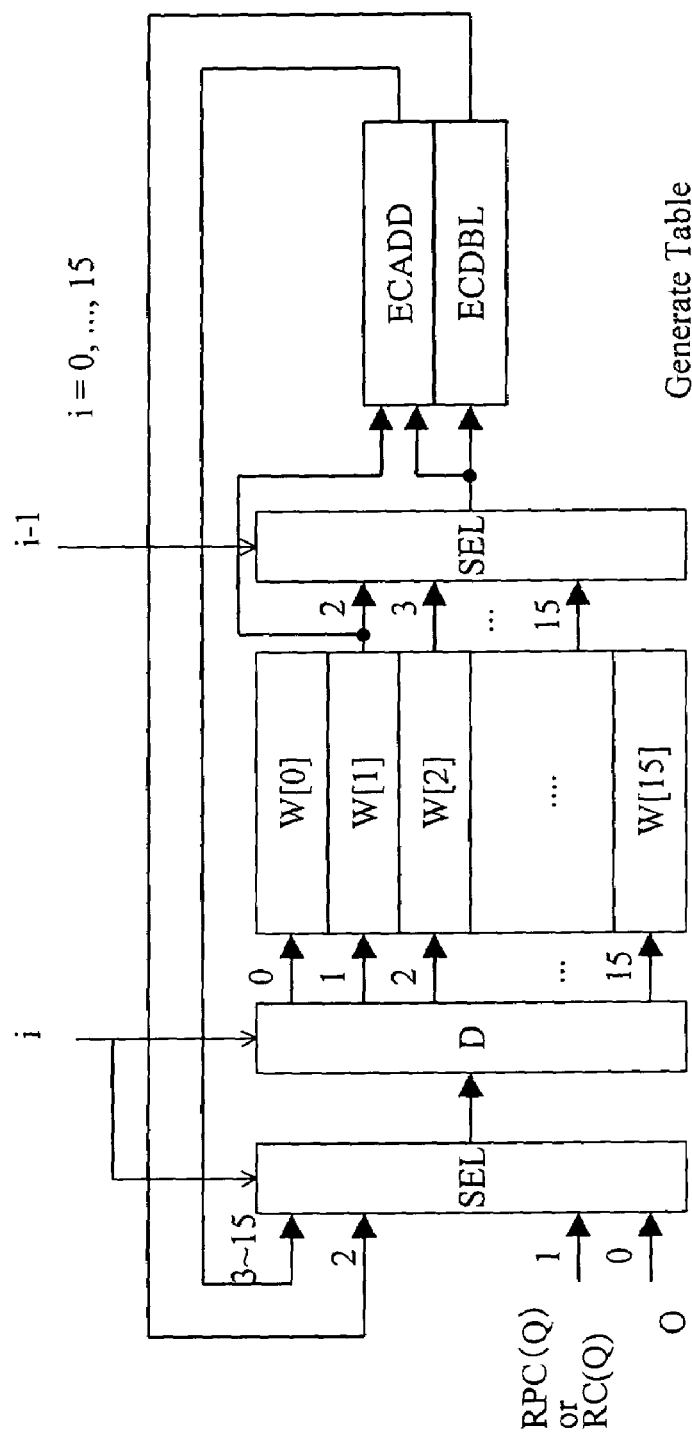
FIGS. 11 and 12 show respective block diagrams implementing Algorithms 9 and 9'.
Figure 12:
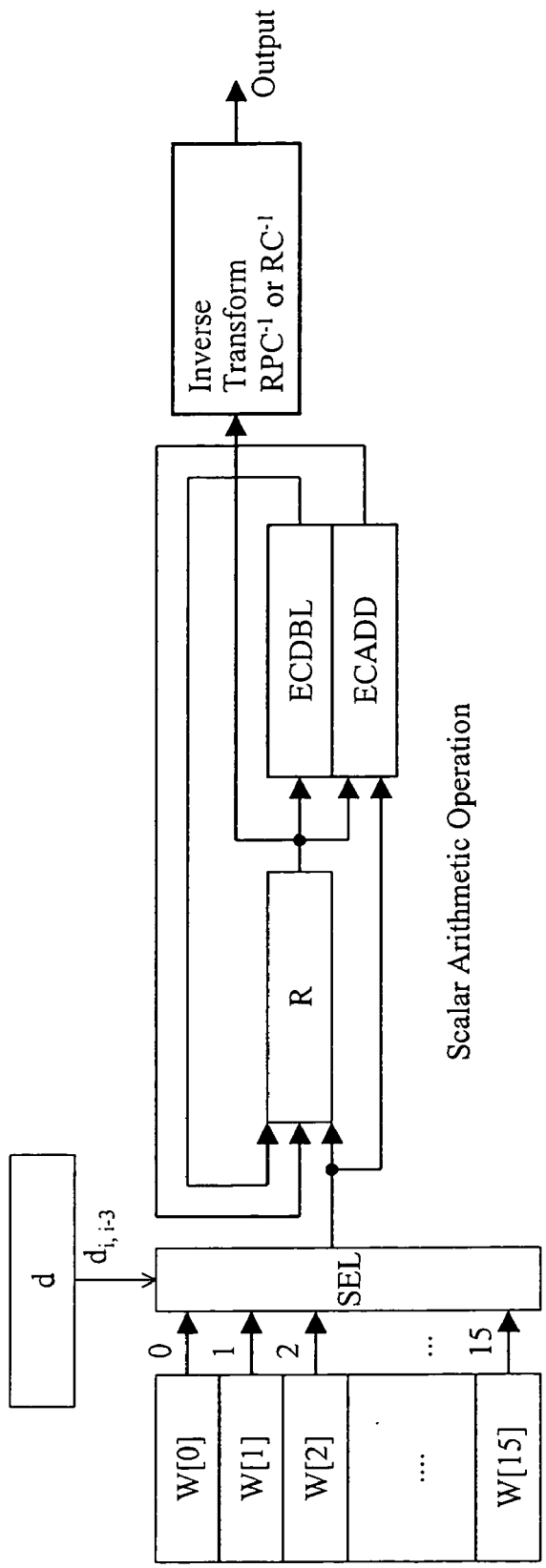

In the block diagrams of FIGS. 22 and 23 of comparison with the block diagram of Algorithms 9 and 9' of FIG. 11, the number of point additions and point doublings on the elliptic curve is the same, and the only difference is the inclusion of an XOR of the index with the random value.

Algorithms 11, 11', Algorithms 12 and 12', and Algorithms 13 and 13' in accordance with the invention, like Algorithms 10 and 10', are secure against the address-bit DPA. In relation to the overhead, in comparison with Algorithms 5 and 6, Algorithms 5' to 7', and Algorithms 9 and 9', the number of operations (ECDBL and ECADD) of a point on the elliptic curve does not increase in Algorithms 11 and 12, Algorithms 10' to 12', and Algorithms 13 and 13', and the only added overhead portion is the computation of the index. Thus, similarly to Algorithm 8, the added overhead portion associated with the countermeasures according to the invention is substantially negligible.

Figure 24:
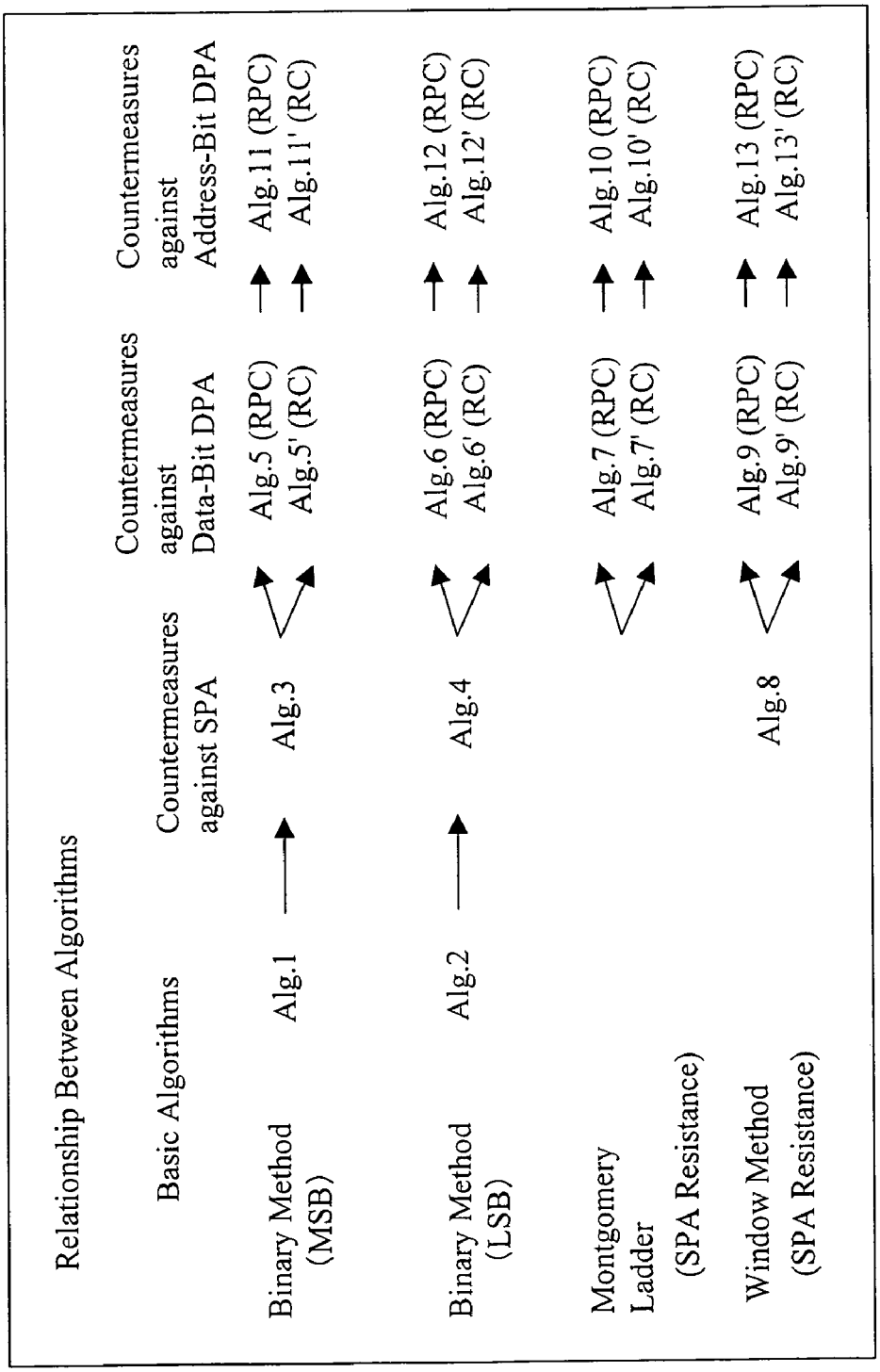
FIG. 24 shows the relationship among the different algorithms.

FIG. 24 shows the relationship among the different algorithms.

Using the techniques in accordance with the embodiment of the invention described above, the countermeasures against the address-bit DPA can be applied to Algorithms 5 to 7, Algorithms 5' to 7', and Algorithms 9 and 9'. The only added overhead portion is the scalar value computations (shifts and XORs), and does not involve excessive operations on a point on the elliptic curve. In elliptic curve encryption, the amount of computation other than that of the operations on the point is substantially negligible, and hence the added overhead portion associated with the techniques of the invention can be disregarded. When the techniques are applied to the methods of Coron '99, Messerges '99, CJ 01 and YITT 02, the number of operations on a point on the elliptic curve increases by about 5% to 15%. Thus, the techniques according to the invention can provide the address-bit DPA countermeasures without entailing reduction in speed, and hence a method of implementing elliptic curve encryption which is secure against the SPA, the data-bit DPA, and the address-bit DPA is provided.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An encryption device for performing elliptic curve encryption using a secret key, comprising:
   a storage unit having a plurality of data storing areas;
   an operation unit performing scalar multiplication of a point on an elliptic curve in accordance with an exclusive OR of a bit sequence of a given scalar value d with a random value, and storing resultant data to one of the plurality of data storing areas; and
   a determiner unit determining, in accordance with the random value, one of the plurality of data storing areas that is to be coupled to the operation unit for each scalar multiplication.

2. An encryption device according to claim 1, wherein the operation unit performs the scalar multiplication in accordance with the binary method using the add-and-double-always.

3. An encryption device according to claim 1, wherein the operation unit performs the scalar multiplication in accordance with the Montgomery-Ladder method.

4. An encryption device according to claim 1, wherein the operation unit performs the scalar multiplication in accordance with the window method.

5. An encryption device according to claim 1, wherein the operation unit performs an operation which includes a transform in accordance with the RPC method.

6. An encryption device according to claim 1, wherein the operation unit performs an operation which includes a transform in accordance with the RC method.

7. An encryption device for performing elliptic curve encryption using a secret key, comprising:
   a storage unit having a plurality of data storing areas;
   an operation unit performing scalar multiplication of a point on an elliptic curve in accordance with a random value, and storing resultant data to one of the plurality of data storing areas in accordance with the random value; and
   a determiner unit determining, in accordance with an exclusive OR of a bit sequence of a given scalar value d with the random value, one of the plurality of data storing areas for selecting data, and determining, in accordance with the random value, one of the plurality of data storing areas for storing the selected data that is to be coupled to the operation unit for each scalar multiplication.

8. A computer-readable storage medium having stored therein a program for use in an information processing apparatus and for performing elliptic curve encryption using a secret key, said program being operable to execute operations of:
   determining a product of scalar multiplication of a point on an elliptic curve in accordance with an exclusive OR of a bit sequence of a given scalar value d with a random value, and storing resultant data to one of the plurality of data storage areas; and determining, in accordance with the random value, one of the plurality of data storage areas that is to be coupled when used for each scalar multiplication.

9. The computer-readable storage medium according to claim 8, wherein the determining of a product of scalar multiplication comprises performing the scalar multiplication in accordance with the binary method using the add-and-double-always.

10. The computer-readable storage medium according to claim 8, wherein the determining of a product of scalar multiplication comprises performing the scalar multiplication in accordance with the Montgomery-Ladder method.

11. The computer-readable storage medium according to claim 8, wherein the determining of a product of scalar multiplication comprises performing the scalar multiplication in accordance with the window method.

12. The computer-readable storage medium according to claim 8, wherein the determining of a product of scalar multiplication comprises performing an operation which includes a transform in accordance with the RPC method.

13. The computer-readable storage medium according to claim 8, wherein the determining of a product of scalar multiplication comprises performing an operation which includes a transform in accordance with the RC method.

14. A computer-readable storage medium having stored therein a program for use in an information processing apparatus and for performing elliptic curve encryption using a secret key, said program being operable to execute operations of:
    determining a product of scalar multiplication of a point on an elliptic curve in accordance with a random value, and storing resultant data to one of a plurality of data storage areas in accordance with the random value; and
    determining, in accordance with an exclusive OR of a bit sequence of a given scalar value d with the random value, one of the plurality of data storage areas for selecting data, and determining, in accordance with the random value, one of the plurality of data storing areas for storing the selected data that is to be coupled when used for each scalar multiplication.

15. A method for performing elliptic curve encryption using a secret key, said method comprising:
    configuring a processor to perform:
    determining a product of scalar multiplication of a point on an elliptic curve in accordance with an exclusive OR of a bit sequence of a given scalar value d with a random value, and storing resultant data to one of the plurality of data storage areas; and
    determining, in accordance with the random value one of the plurality of data storage areas that is to be coupled when used for each scalar multiplication.

16. A method according to claim 15, wherein the determining of a product of scalar multiplication comprises performing an operation which includes a transform in accordance with the RC method.

17. A method according to claim 15, wherein the determining of a product of scalar multiplication comprises performing the scalar multiplication in accordance with the binary method using the add-and-double-always.

18. A method according to claim 15, wherein the determining of a product of scalar multiplication comprises performing the scaler multiplication in accordance with the Montgomery-Ladder method.

19. A method according to claim 15, wherein the determining of a product of scalar multiplication comprises performing the scalar multiplication in accordance with the window method.

20. A method according to claim 15, wherein the determining of a product of scalar multiplication comprises performing an operation which includes a transform in accordance with the RPC method.

21. A method for performing elliptic curve encryption using a secret key, said method comprising:
    configuring a processor to perform:
    determining a product of scalar multiplication of a point on an elliptic curve in accordance with a random value, and storing resultant data to one of a plurality of data storage areas in accordance with the random value; and
    determining, in accordance with an exclusive OR of a bit sequence of a given scalar value d with the random value, one of the plurality of data storage areas for selecting data, and determining, in accordance with the random value, one of the plurality of data storing areas for storing the selected data that is to be coupled when used for each scalar multiplication.

22. An encryption device for performing elliptic curve encryption using a secret key, comprising:
    a storage having a plurality of data storing areas;
    an operation unit performing scalar multiplication of a point on an elliptic curve in accordance with an exclusive OR of a bit sequence of a scalar value d with a bit-shifted value resulted from an exclusive OR of the bit sequence of the scalar value d with a random value; and
    a determiner unit determining, in accordance with the random value, an address of one of the plurality of data storing areas that is to be coupled to the operation unit for each scalar multiplication and storing resultant data to one of the plurality of data storing areas.

* * * * *

UNITED STATES PATENT AND TRADEMARK OFFICE
CERTIFICATE OF CORRECTION

PATENT NO. : 7,536,011 B2
APPLICATION NO. : 11/045111
DATED : May 19, 2009
INVENTOR(S) : Masahiko Takenaka et al.

It is certified that error appears in the above-identified patent and that said Letters Patent is hereby corrected as shown below:

Column 1, Line 7, change "PCT/JPO2/13269" to --PCT/JP02/13269--.

Column 23, Line 49, change "value" to --value,--.

Column 24, Line 11, change "scaler" to --scalar--.

Column 24, Line 37, after "a storage" insert --unit--.

Signed and Sealed this

Sixth Day of October, 2009

David J. Kappos
*Director of the United States Patent and Trademark Office*